(12) United States Patent
Schmid et al.

(10) Patent No.: US 12,173,758 B2
(45) Date of Patent: Dec. 24, 2024

(54) SHIFTING ELEMENT FOR AN AUTOMATIC TRANSMISSION

(71) Applicant: ZF Friedrichshafen AG, Friedrichshafen (DE)

(72) Inventors: Wolfgang Schmid, Tettnang (DE); Bernhard Sauter, Tettnang (DE); Hans Heckenberger, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 17/434,199

(22) PCT Filed: Jan. 31, 2020

(86) PCT No.: PCT/EP2020/052435
§ 371 (c)(1),
(2) Date: Aug. 26, 2021

(87) PCT Pub. No.: WO2020/173661
PCT Pub. Date: Sep. 3, 2020

(65) Prior Publication Data
US 2022/0170516 A1   Jun. 2, 2022

(30) Foreign Application Priority Data
Feb. 27, 2019 (DE) ............... 10 2019 202 617.6

(51) Int. Cl.
*F16D 25/0638* (2006.01)
*F16D 25/08* (2006.01)
(Continued)

(52) U.S. Cl.
CPC ....... *F16D 25/0638* (2013.01); *F16D 25/088* (2013.01); *F16D 25/14* (2013.01);
(Continued)

(58) Field of Classification Search
CPC .......... F16D 25/0638; F16D 2025/081; F16D 2025/082
See application file for complete search history.

(56) References Cited

U.S. PATENT DOCUMENTS 6,101,438 A    8/2000 Staiger et al.
9,163,646 B2*  10/2015 Haupt ................ F16K 11/0716
(Continued)

FOREIGN PATENT DOCUMENTS

DE    19546292 A1   6/1997
DE    10247702 A1   4/2004
(Continued)

OTHER PUBLICATIONS

International Search Report (English Translation) PCT/EP2020/052435, dated Apr. 8, 2020. (2 pages).
(Continued)

*Primary Examiner* — Stacey A Fluhart
(74) *Attorney, Agent, or Firm* — Dority & Manning, P.A.

(57) ABSTRACT

A hydraulically actuatable shift element (100) includes a clutch piston (101), a fast fill piston (102), a fast fill valve (103), a fast fill pressure chamber (126), and a clutch pressure chamber (117). The fast fill valve (103) includes a sealing body (132) and a control body (131). Before the actuation of the shift element (100), the sealing body (132) is in a first switching position, in which the fast fill pressure chamber (126) is connected to a pressurized oil source (108) and, after the actuation of the shift element (100) in a second switching position, seals off the fast fill pressure chamber (126) with respect to the rest of the hydraulic system. The control body (131) has a first pressure surface (A18) and a second pressure surface (A19), wherein, in the first switching position, only the first pressure surface (A18) is pressurizable from the pressurized oil source (108). The fast fill valve (103) is configured such that, in the second switching
(Continued)

position or between the first switching position and the second switching position of the control body (131), the second pressure surface (A19), in addition to the first pressure surface (A18), is pressurizable.

25 Claims, 9 Drawing Sheets

(51) Int. Cl.
*F16D 48/02* (2006.01)
*F16H 61/02* (2006.01)
*F16H 61/06* (2006.01)
*F16H 61/30* (2006.01)
*F16H 63/30* (2006.01)

(52) U.S. Cl.
CPC ....... *F16H 61/0276* (2013.01); *F16H 61/061* (2013.01); *F16H 61/30* (2013.01); *F16H 63/3026* (2013.01); *F16H 2061/062* (2013.01); *F16H 2306/36* (2013.01)

(56) References Cited

U.S. PATENT DOCUMENTS

| | | | |
|---|---|---|---|
| 10,100,924 B2* | 10/2018 | Schiele | F04C 14/265 |
| 2010/0304927 A1* | 12/2010 | Neelakantan | F16D 48/02 |
| | | | 192/52.4 |
| 2014/0033845 A1 | 2/2014 | Kamada et al. | |
| 2016/0116004 A1* | 4/2016 | Ikeda | F16K 31/408 |
| | | | 137/625.25 |
| 2020/0102989 A1* | 4/2020 | Cattoor | F16D 25/14 |

FOREIGN PATENT DOCUMENTS

| | | |
|---|---|---|
| DE | 102010021899 A1 | 12/2011 |
| DE | 112012001780 T5 | 1/2014 |
| DE | 102017213681 A1 | 2/2019 |

OTHER PUBLICATIONS

German Search Report DE 10 2019 202 617.6, dated Nov. 7, 2019. (12 pages).

* cited by examiner

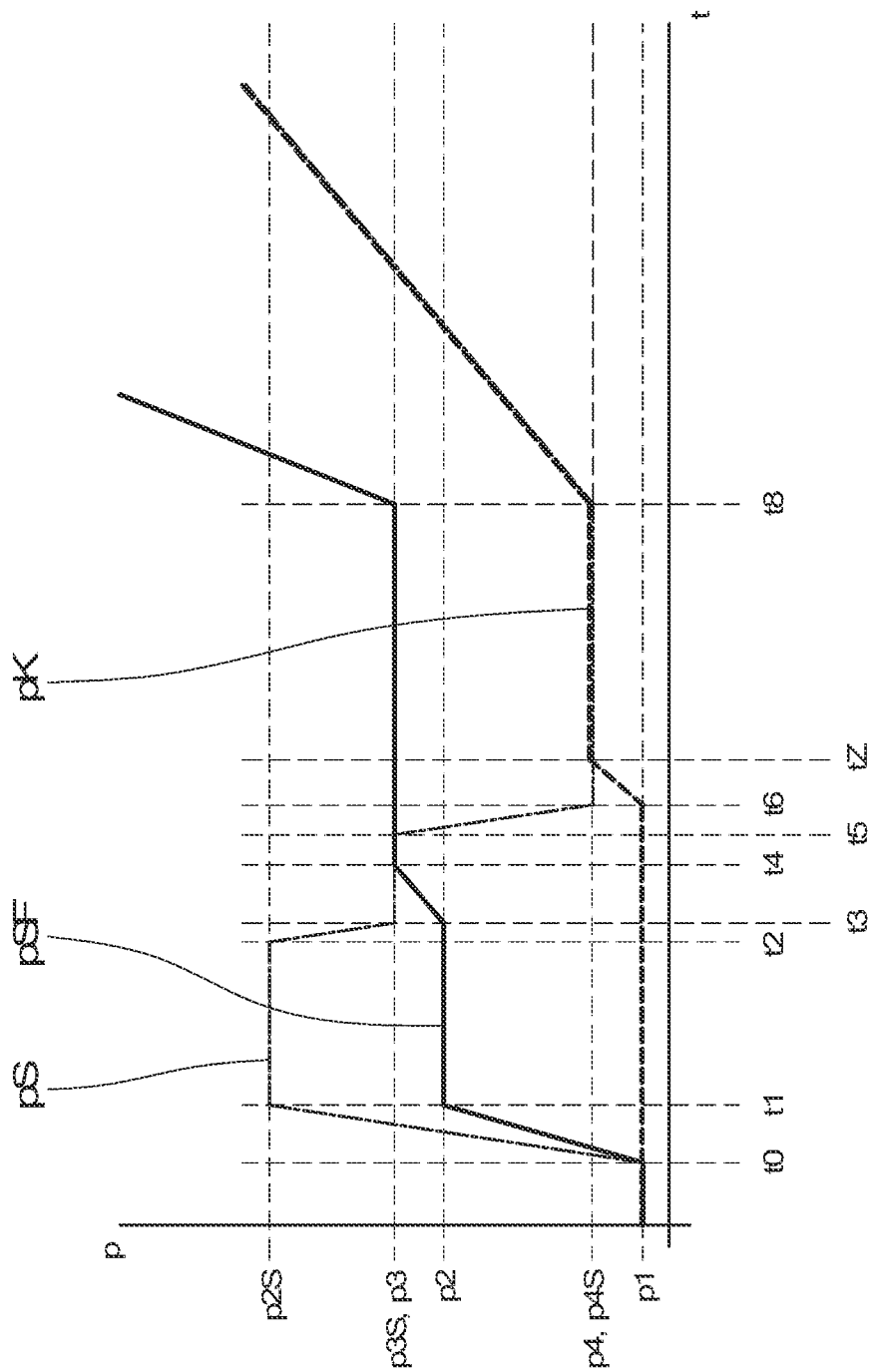

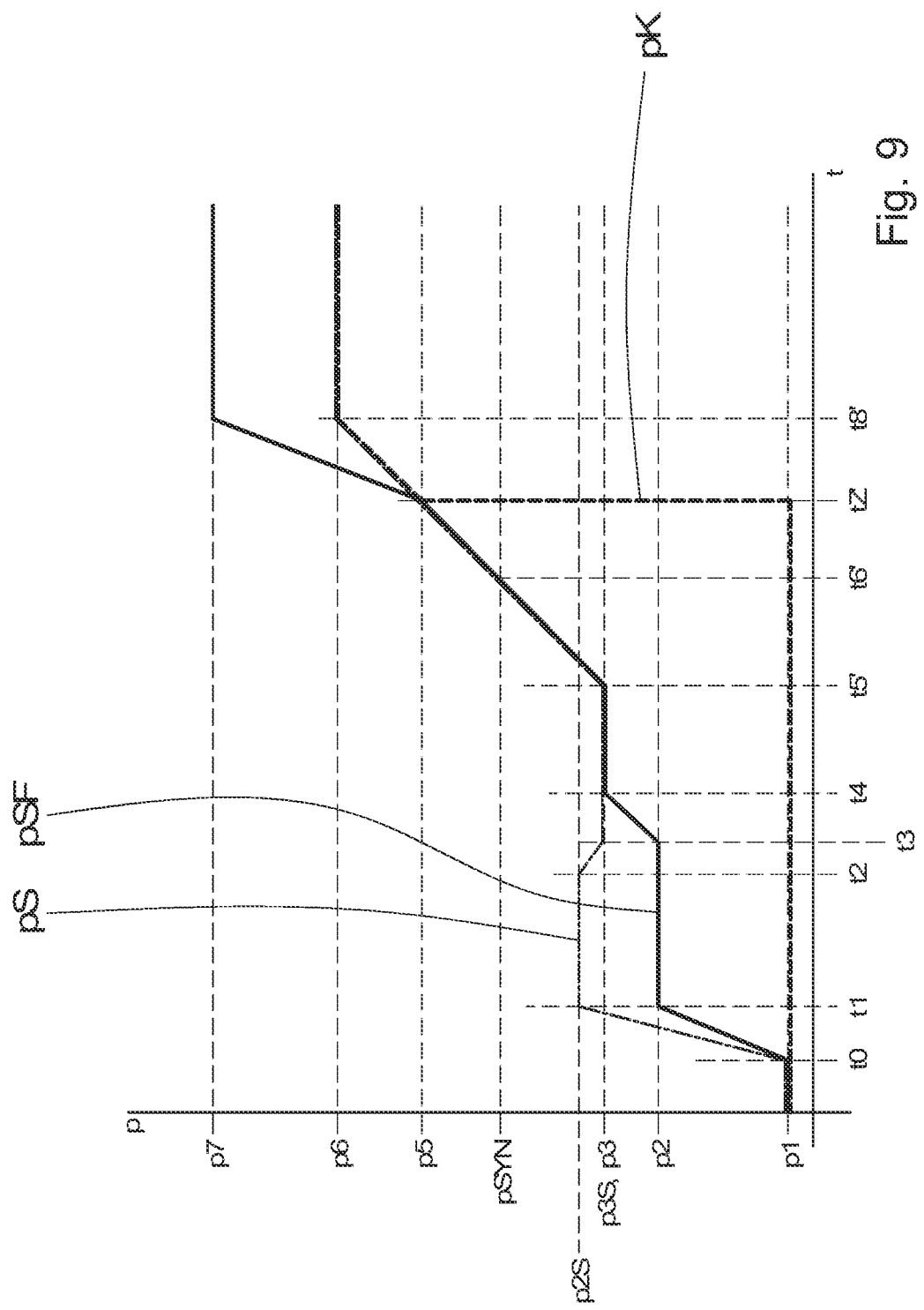

SHIFTING ELEMENT FOR AN AUTOMATIC TRANSMISSION

CROSS-REFERENCE TO RELATED APPLICATIONS

The present application is related and has right of priority to German Patent Application No. 102019202617.6 filed in the German Patent Office on Feb. 27, 2019 and is a nationalization of PCT/EP2020/052435 filed in the European Patent Office on Jan. 31, 2020, both of which are incorporated by reference in their entirety for all purposes.

FIELD OF THE INVENTION

The invention relates generally to a hydraulically actuatable shift element for an automatic transmission, an automatic transmission having a shift element of this type, and to a method for actuating the shift element.

BACKGROUND

DE 10247702 A1 of the applicant describes an automatic transmission, which includes multiple friction-locking shift elements for torque transmission and for establishing the frictional connection. A friction-locking shift element, which is also referred to as a multi-disk clutch, includes an inner disk carrier, an outer disk carrier, a disk pack, and a clutch piston and a clutch cylinder, in which the clutch piston is displaceably arranged. The disk pack includes outer and inner clutch disks, wherein the outer clutch disks are coupled to the outer disk carrier in a rotationally fixed manner and the inner clutch disks are coupled to the inner disk carrier in a rotationally fixed manner. Outer and inner clutch disks are axially displaceable with respect to the particular respective carrier of the outer and inner clutch disks. Outer and inner clutch disks are arranged within the disk pack in such a way that the outer and inner clutch disks alternate with each other in the axial direction and, in this way, engage into one another.

In order to build up a friction torque, the disks are pressed against each other by the pressurized clutch piston, and so a friction-locking connection arises between the disks. As a result, the clutch can transmit a torque between a transmission element coupled to the outer disk carrier in a rotationally fixed manner and a transmission element coupled to the inner disk carrier in a rotationally fixed manner. In the non-actuated, i.e., disengaged condition of the clutch, when the clutch piston is not pressurized, a certain axial play is present between the disks, in order to keep the drag torque as low as possible when, during operation, the particular clutch is not engaged, but rotates without load. An axial load is to be understood to be the freedom of motion in the direction of the axis of rotation of the shift element. In addition to the axial play between the disks, there is a possible axial play between the clutch piston and the disk pack. It is also possible that a wave spring is arranged between the clutch piston and the disk pack, which presses the disks against one another with so little force that they still cannot transmit a torque that is noticeable in the drive train or is even sufficient for driving the vehicle. The axial plays between the disks, the clutch piston, and the disk pack, as well as the spring travel of the wave spring add up to a measure of the axial freedom of motion, which is referred to in the following as clearance.

During the engagement of the clutch, which is also referred to in the following as closing, initially the clutch piston is to be moved, by the operating medium applying pressure thereon, so far that the clearance is eliminated and the disks rest against one another. During the movement of the clutch piston by pressure being applied thereon, the volume of a clutch pressure chamber in the clutch cylinder increases, and so this volume is to be filled by the oil supply system and the transmission pump. Only then is it possible to press upon the disks by a further application of pressure onto the clutch piston and, thereby, transmit torque.

The general term shift elements or clutches encompasses, in this context, transmission clutches, which can connect two rotary parts to each other, as well as transmission brakes, which can rotationally fix a rotary drive element to the transmission housing. Processes described in the following, in particular the filling of a clutch for the purpose of applying pressure, apply equally for transmission clutches as well as transmission brakes.

The clutch piston has a hydraulic pressure surface, onto which pressure can be applied, and is axially displaced, during an application of pressure, by the distance of the clearance, and so a volume to be filled for this purpose, which is referred to in the following as a fast fill volume, is computed as the product of the surface area of the hydraulic pressure surface and the distance of the clearance. The process of filling the shift element in a short time in order to compensate for the clearance is referred to in the following as rapid filling. A hydraulic pressure surface is to be understood, in this context, to be a surface of a hydraulic piston, onto which a pressure acts in a direction, in which the piston or valve slide is displaceable, wherein the surface is the projected area in this direction. Usually this is a circular or annular surface, since these components are usually designed to be cylindrical and the displacement takes place axially, i.e., in the direction of the cylinder axis. A shift time, which passes from the gear shift signal for triggering the changeover of a gear stage up to the engagement of the particular clutch and, thereby, the engagement of a new gear stage (also referred to as a gear), must be as short as possible for the sake of spontaneity, i.e., for a fast gear change. For this reason, the filling of the volume must take place very quickly in a short filling time. The quotient of the filling volume divided by the filling time is the flow requirement that the oil supply of the automatic transmission and, thereby, ultimately, the transmission pump must provide, as the flow rate.

The flow rate of a transmission pump usually designed as a positive displacement pump is, in terms of the physical quantity, a pump capacity and is computed as the product of pump speed and displacement volume. Positive displacement pumps are, for example, gear pumps, vane pumps, or piston pumps. The displacement volume is the volume that a positive displacement pump theoretically (geometrically ideally or subject to efficiency) delivers per revolution of the pump. The engagement of a gear from neutral, for example, usually takes place when the internal combustion engine driving the transmission pump rotates at idling speed, i.e., the rotational speed of the transmission pump is very low. During the gear changes during a driving operation when the gear stages are changed, the rotational speed of the transmission pump is, in fact, higher, but the filling time should be even shorter. The displacement volume of the transmission pump is selected in such a way that a pump capacity is achieved, which is sufficient for filling the clutch in a certain necessary period of time at a certain rotational speed. The least favorable case is to be covered here, i.e., the necessary displacement volume of the transmission pump is the highest quotient of volume to be filled divided by the product of required period of time and rotational speed of the transmission pump set during the filling process.

The diameter and/or width of a pump increase(s) with the displacement volume. Since the width is fluidically limited in the case of a positive displacement pump, the diameter of the rotating parts usually increases. As the diameter of the rotating parts increases, not only does the installation space also increase, but, in addition, the input torque and, thereby, the input power progressively increase. In addition, the high pump capacity of the transmission pump outside of the gear shifts—and, thereby, in the temporally predominant portion of the period of operation—is not necessary, since, during travel in one and the same gear stage, only the leakage amount for maintaining a clutch pressure as well as an amount of cooling oil and lube oil are needed. Nevertheless, the entire pump capacity—also referred to as flow rate—must be brought to the maximally necessary pressure, which also increases the input power of the transmission pump and, thereby, results in a deterioration of the transmission efficiency.

In the German patent application 102007218081.2 of the applicant, which was not previously published, a lamellar shift element is disclosed, which includes not only the clutch piston, but also a fast fill piston and a fast fill valve for the open-loop control of the rapid filling. The fast fill valve includes a control body and a sealing body. In this case, at the beginning of the rapid filling from a pressurized oil source, initially a fast fill pressure chamber between the fast fill valve and the fast fill piston is filled, wherein the volume of the fast fill pressure chamber and/or of the fast fill piston is considerably smaller than the volume of the clutch pressure chamber and/or the surface of the clutch piston, onto which pressure can be applied. For this reason, the fast fill pressure must be greater, in accordance with the area ratio, than a fast fill pressure with which a clutch pressure chamber is directly filled. The pressurized oil source is usually a pressure-adjusting device, which is arranged in a hydraulic control unit. The hydraulic control unit is supplied by a transmission pump with the operating medium, usually transmission oil.

Since the volume of the fast fill pressure chamber to be filled during the rapid filling is smaller—in the same proportion—than the volume of the clutch pressure chamber, the flow to be generated by the transmission pump during the rapid filling time can be smaller to the same extent. As a result, advantageously, the transmission pump can be smaller-dimensioned with respect to displacement volume in comparison to shift elements having direct filling of the clutch pressure chamber, which results in a lower power consumption of the transmission pump across the same operating range and, thereby, a higher transmission efficiency. After the completion of the rapid filling, the fast fill valve controls, by way of an open-loop system, the filling and pressurization of the clutch pressure chamber, which takes place at a lower pressure level than the rapid filling, and so the higher fast fill pressure must be generated only during the short fast fill time. After the rapid filling, the fast fill pressure chamber is sealed off by a sealing body, and so the elevated fast fill pressure is maintained in the fast fill pressure chamber.

The sealing-off of the fast fill pressure chamber may take place, however, only if the fast fill piston has pressed the clutch piston against the disk pack and eliminated the clearance, and so the rapid filling is concluded. In order to ensure this, the sealing body must be held back for as long as necessary. This takes place, in this prior art, by a locking device having spring-loaded locking disks, which press, in the radial direction, onto a bevel at the piston-shaped control body and, in this way, generate a friction force, which counteracts the compressive force acting axially upon the control body. At a certain pressure, the control body overcomes the resistance of the locking disks and is then displaced into a position, in which the sealing body seals off the fast fill pressure chamber. In this position, the elevated fast fill pressure is then enclosed in the fast fill pressure chamber and the control body unblocks, via a leading edge, a duct, through which the clutch pressure chamber is then filled from the pressurized oil source at a reduced pressure and is pressurized, so that a torque is transmittable via the disk pack and, thereby, the shift element is engaged.

One problem of the locking device having the spring-loaded locking disks is a resultant radial force, which, due to unequal spring forces due to manufacturing tolerances, acts upon the piston, as well as inaccuracies in the setting of the friction force due to the manufacture of the surfaces and wear arising thereon throughout the period of operation. In addition, the locking disks, with their associated compression springs, represent an increased installation effort and a larger number of components, which ultimately means higher costs. In addition, with the arrangement of the locking disks, the radial installation space as well as the production costs of the shift element increase due to the manufacture of the locking disk bore holes. In addition, the reliability of the overall system decreases due to possible wear or damage in the additional components of the locking device.

SUMMARY OF THE INVENTION

Example aspects of the invention create a shift element for an automatic transmission, which has a low flow requirement in combination with a simple configuration and a function that is reliable throughout the service life. In particular, short shift times and spontaneity should not be adversely affected.

Accordingly, a hydraulically actuatable shift element includes a clutch piston, a fast fill piston, and a valve device, as well as a fast fill pressure chamber and a clutch pressure chamber. The valve device, which is also referred to as a fast fill valve, includes a sealing body and a control body. Before the actuation of the shift element, the sealing body is in a first switching position, in which the fast fill pressure chamber is connected to a pressurized oil source and, thereby, is pressurizable by the pressurized oil source. During or after the actuation of the shift element, the sealing body is in a second switching position, in which the sealing body seals off the fast fill pressure chamber with respect to the rest of the hydraulic system.

Before the actuation of the shift element, the control body is in a first switching position, in which the control body interrupts a hydraulic connection from the pressurized oil source to the rest of the hydraulic system and, thereby, to the clutch pressure chamber or to the sealing body. The control body has a first pressure surface, which, when the control body is in the first switching position, can be acted upon by pressure from the pressurized oil source. During or after the actuation of the shift element, the control body is in a second switching position, in which the control body connects the pressurized oil source to the clutch pressure chamber or to the sealing body.

According to example aspects of the invention, the control body has a second pressure surface, wherein the fast fill valve is designed in such a way that, in the second switching position or between the first switching position and the second switching position of the control body, the second pressure surface, in addition to the first pressure surface, can be acted upon by pressure from the pressurized oil source. Since the first pressure surface is smaller than the sum of the first pressure surface and the second pressure surface, the force on the control body counter to the force of a spring is initially relatively low at the onset of a pressure application, and so the control body does not yet unblock a connection from the pressurized oil source to the clutch pressure chamber or to the sealing body. This takes place only at a certain higher pressure, which has the advantage that a sufficient amount of time is available, in which the fast fill pressure chamber is pressurized via the pressurized oil source and the clearance can be reduced.

In one example embodiment of the invention, the control body and the sealing body are fixedly connected to each other, which offers advantages with regard to the number of parts and the costs.

Alternatively, the control body and the sealing body can be designed as separate components, which can result in advantages with regard to function.

Preferably, it is provided in this example alternative that the control body and the sealing body are mechanically coupled and axially displaceable relative to each other.

In one preferred example embodiment, an expanding spring can be arranged between the control body and the sealing body, as the result of which a reliable sealing effect is achieved during the sealing-off of the fast fill pressure chamber, since the sealing body is pressed against a valve seat via the force of the expanding spring. The great advantage of this example embodiment is that the fast fill pressure is securely enclosed in the fast fill pressure chamber before a pressure can build up in the clutch pressure chamber on the opposite side of the fast fill piston, since the control aperture—and, thereby, the inflow from the pressurized oil source to the clutch pressure chamber—is opened only after the fast fill compression chamber has been sealed off.

It is possible that the clutch pressure chamber is connected to the pressurized oil source in the second switching position of the control body and, thereby, the clutch piston can be acted upon by pressure from the pressurized oil source.

Preferably, the control body and the sealing body can be arranged concentrically to each other in a valve bore. Advantageously, this yields a compact, installation space-saving arrangement.

In an alternative example embodiment, the control body and the sealing body are hydraulically coupled. A coupling is to be understood, in this context, to be a hydraulic operative connection, via which, for example, a hydraulic force is transmittable.

In an example embodiment of this type, the control body and the sealing body are arranged spatially separated from each other. This yields the advantage of flexibility in the spatial arrangement of the control body and the sealing body in the transmission.

In this context, in one preferred example embodiment, the control body, in the first switching position, interrupts a hydraulic connection between the pressurized oil source and the sealing body and, in a second switching position, establishes a hydraulic connection between the pressurized oil source and the sealing body in such a way that the sealing body can be acted upon by pressure and, in the second switching position, can be displaced. In the second switching position, the sealing body seals off the fast fill pressure chamber, wherein, in the second switching position of the sealing body and of the control body, the clutch pressure chamber is connected to the pressurized oil source.

In one example embodiment, the fast fill valve includes a control valve and a sealing valve, wherein the control valve includes the control body and the sealing valve includes the sealing body.

The sealing body may be held in the first switching position by the force of a control compression spring and, when acted upon by pressure from the pressurized oil source, is displaceable into the second switching position, in which the pressurized oil source is hydraulically connected to the sealing valve by the control valve.

The sealing body may be held in the first switching position by the force of a sealing compression spring and is displaceable into the second switching position when acted upon by pressure from the pressurized oil source in an actuating pressure chamber.

In the case of a hydraulic coupling of the control body and the sealing body, the surface area of the first pressure surface of the control body and the force of the control compression spring as well as the surface areas of the pressure surfaces of the sealing body and the force of the sealing compression spring may be selected in such a way that the control body and the sealing body can be displaced into the respective second switching position only if the fast fill pressure is so high that the clearance is eliminated.

In addition, in the case of a hydraulic coupling of the control body and the sealing body, the sealing body, starting from the first switching position, may be connected in an actuating pressure chamber to the pressurized oil source and, thereby, can be acted upon by pressure when the control body is in the second switching position.

Alternatively, the surface area of the first pressure surface of the control body and the force of the control compression spring as well as the surface areas of the pressure surfaces of the sealing body and the force of the sealing body compression spring may be selected in such a way that the control body and the sealing body can be displaced into the respective second switching position only if a synchronous pressure value is exceeded, at which the shift element can transmit the necessary torque without slip. This has the advantage that the shift element remains securely engaged and no torque fluctuations, which reduce comfort, can occur. With respect to the pressure acting upon the fast fill piston, the area ratio at the fast fill piston is to be noted, in order to arrive at the synchronous pressure value that must act upon the clutch piston in order to establish a frictional connection.

In an example embodiment having a mechanically coupled control body and sealing body, a ratio of the surface areas of the pressure surfaces of the control body and the sealing body and the force of the compression spring may be selected in such a way that the control body can be displaced into a position, in which the control body unblocks a connection from the pressurized oil source to the clutch pressure chamber only if the fast fill pressure is so high that the clearance is eliminated.

Alternatively, a ratio of the surface areas of the pressure surfaces of the control body and the sealing body and the force of the compression spring may be selected in such a way that the control body can be displaced into a position, in which the control body unblocks a connection from the pressurized oil source to the clutch pressure chamber only if a synchronous pressure value is exceeded, at which the shift element can transmit the necessary torque without slip. This has the aforementioned advantage that the shift element remains securely engaged and no disadvantageous torque fluctuations can occur.

Preferably, the control body includes two essentially cylindrical control body sections, which have different outer diameters and are guided in a stepped bore having appropriate inner diameters. The inner diameters and outer diameters form clearance fits. As a result, the two different pressure surfaces are manufacturable using simple manufacturing steps.

Preferably, a hydraulically actuatable shift element for an automatic transmission includes a clutch piston having a first hydraulic pressure surface and multiple friction bodies, wherein the hydraulic pressure surface of the clutch piston can be acted upon by pressure, in a clutch pressure chamber, with a clutch pressure from a pressurized oil source, in order to engage the shift element by increasing the friction torque or establishing static friction at the friction partners or at least increasing the torque transmission capacity, in that the friction bodies are pressed against one another. A clearance is present at least between the friction bodies in the non-actuated condition of the shift element. The shift element includes a device for reducing the clearance, in which a force is generatable. The device is arranged in such a way that this force on the friction bodies acts upon the friction bodies in such a way that the clearance is reduced or becomes zero. The pressurized oil source is actuatable by an electronic control unit (ECU) in order to adjust the pressures.

As a result, advantageously, the reduction or elimination of the clearance is carried out by the device and the clutch pressure chamber does not need to be filled with a high flow of operating medium, and so the displacement volume of the transmission pump can be reduced. The "elimination" of the clearance is to be understood to mean that absolutely no play remains between the disks.

Preferably, after the clearance has been eliminated, the force of the device exerted upon the friction partners is selected to be only so great that a torque that is sufficient for driving a vehicle is not transmittable by the shift element.

The pressurized oil source can be designed as a hydraulic control unit, which includes valve devices and pressure-adjusting devices, by which a flow delivered by a transmission pump is conducted to various shift elements and a pressure is settable downstream from the hydraulic control unit.

In one preferred example embodiment, the friction bodies form a disk pack and that the device for reducing the clearance includes a fast fill piston and a sealing body for fixing the fast fill piston. In the non-actuated condition of the shift element, the fast fill piston rests against the clutch piston. A force on the fast fill piston is generatable by the device, and so the clutch piston is displaceable by the fast fill piston against the disk pack in order to reduce or eliminate the clearance. The sealing body at least intermittently fixes the fast fill piston against sliding back, in the position, in which the clearance is reduced or eliminated.

In one advantageous example embodiment, the fast fill piston is hydraulically actuatable and has a second hydraulic pressure surface on the side facing away from the clutch piston, wherein the second hydraulic pressure surface can be acted upon by pressure in a fast fill pressure chamber. The second hydraulic pressure surface of the fast fill piston is smaller than the first hydraulic pressure surface of the fast fill piston. The ratio of the surface areas of the second hydraulic pressure surface with respect to the first hydraulic pressure surface forms a first area ratio. During the application of pressure upon the second hydraulic pressure surface, the fast fill piston is mechanically operative upon the clutch piston and can displace the clutch piston in order to eliminate the clearance. This has several advantageous effects: on the one hand, there is a hydraulic actuation of the fast fill piston, since the clutch piston is also hydraulically actuated. The second hydraulic pressure surface at the fast fill piston is smaller than the first hydraulic pressure surface of the clutch piston, although the clutch piston as well as the fast fill piston must be displaced by the same distance in order to eliminate the clearance. Therefore, the filling of the fast fill compression chamber requires a volume or flow that is smaller in accordance with the first area ratio than is the case during a rapid filling of the clutch pressure chamber in order to eliminate the clearance. Therefore, the flow requirement of the automatic transmission decreases, and so the transmission pump can be smaller-dimensioned with respect to the displacement volume of the transmission pump. Positive effects are a lower input power of the transmission pump and, thereby, a higher transmission efficiency, which is ultimately expressed in the form of a lower fuel consumption and lower carbon dioxide ($CO_2$) emissions. In addition, the flat fast fill piston is situatable in a space-saving manner.

In this context, the valve spool may have a fourth hydraulic pressure surface at one end and a fifth hydraulic pressure surface at the opposite end, which, in the first switching position, can be acted upon jointly by the pressurized oil source with an identical pressure, wherein the fourth hydraulic pressure surface is larger than the fifth hydraulic pressure surface.

In one particularly advantageous example embodiment, the valve spool includes a control body and a sealing body, wherein the sealing body and the control body are coupled to each other in such a way that the sealing body and the control body are displaceable relative to each other within two stop positions, wherein the valve spool, in the first switching position of the valve, is in a first stop position, in which the control body and the sealing body are pressed apart by an expanding spring clamped between them, and wherein the valve spool, in the second switching position of the fast fill valve, is in a second stop position, in which the sealing body rests against a valve seat and, thereby, tightly seals off the fast fill pressure chamber and is slid therein, counter to the force of the expanding spring, up to a stop in the control body.

In one preferred example embodiment, a second area ratio of the second hydraulic pressure surface with respect to the third hydraulic pressure surface is greater than a third area ratio of the sixth hydraulic pressure surface with respect to the fourth hydraulic pressure surface. The difference of the two area ratios is selected in such a way that, in the second switching position of the valve spool, the hydraulic force, which, under a certain pressure value, acts upon the valve spool via the fourth hydraulic pressure surface, is greater than the sum of the opposing forces of the compression spring and the expanding spring and of the hydraulic forces of the enclosed fast fill pressure and of the certain pressure on the sealing body. The fast fill pressure in the second switching position of the valve spool is generated, via the second area ratio, from the certain pressure acting also in the clutch pressure chamber, wherein the certain pressure value in the clutch pressure chamber is sufficient for transmitting a torque via the shift element. Due to the selection of the area ratios, it is ensured that the fast fill pressure is also enclosed when the clutch pressure is increased and, thereby, the fast fill piston remains in its position after the clearance has been eliminated.

In one advantageous example embodiment, the fast fill valve opposes a displacement of the valve spool from the first switching position of the valve spool with a first resisting force and permits a displacement of the valve spool in the direction of the second switching position only at a certain minimum pressure value of the pressure prevailing in the control pressure chamber. After the first resisting force has been overcome after the second control body section has emerged from the appropriate bore section, a further resisting force is at least less than the first resisting force.

The shift elements, which are designed as described above, can be designed either as a transmission brake or as a transmission clutch.

In a design of the shift element as a transmission brake, the fast fill valve may be arranged in a fixed part of the transmission.

It is advantageously possible that an automatic transmission includes at least one above-described hydraulically actuatable shift element according to example aspects of the invention. As a result, the flow requirement of the automatic transmission would be considerably reduced depending on the first area ratio, as the result of which the power consumption of the transmission pump decreases and the efficiency of the automatic transmission increases as compared to the prior art.

In a method for actuating an above-described shift element according to example aspects of the invention, in the case of a demand signal to engage the shift element, a signal is output by an electronic transmission control unit (ECU) to the hydraulic control unit and/or to the pressurized oil source included therein, to reduce the clearance and, at an applied or measured point in time, when the clearance has been eliminated, a signal is output for applying pressure to the disk pack. An applied value is to be understood, in this context, to be a value of a certain magnitude, which was ascertained in advance in testing and is stored in the ECU.

According to one further example embodiment of the method, during the actuation of a shift element by an ECU at a starting point in time, a specified pressure is increased to a second specified pressure value and, at an applied second point in time before an anticipated increase of an actual value due to the sealing-off of the fast fill pressure chamber by the valve spool, the specified pressure value is reduced, up to a third point in time, to a third specified pressure value. After waiting for an applied time period up to the completion of the sealing-off of the fast fill pressure chamber at a fifth point in time, then, starting at the fifth point in time, the specified pressure is reduced from the third specified pressure value to a fourth specified pressure value in order to avoid pressure peaks, in particular, in the clutch pressure chamber. The fourth specified pressure value is reached at a sixth point in time, and so, starting at the sixth point in time, the clutch pressure, which also acts upon the control pressure chamber, increases up to the fourth specified pressure value and reaches a fourth pressure value at a seventh point in time. The fourth specified pressure value is held constant up to an applied eighth point in time and, thereafter, is increased to a final specified pressure value, which is reached at a ninth point in time.

An alternative example method is described for a shift element having a fast fill valve, in which the surface areas of the pressure surfaces of the valve spool and the force of the compression spring are selected in such a way that the fast fill pressure can be increased above a pressure, at which the shift element can transmit the necessary torque without slip. This pressure value is also referred to as the synchronous pressure value. After this synchronous pressure value has been exceeded, the control body and/or the valve spool first move(s) so far that a hydraulic connection is established between the pressurized oil source and the clutch pressure chamber and, in this way, pressure is applied onto the clutch piston. This has the advantage that the shift element is securely engaged and no negative effects can arise due to pressure fluctuations.

BRIEF DESCRIPTION OF THE DRAWINGS

Exemplary embodiments of the shift element according to example aspects of the invention are represented in the drawings and are described in greater detail in the following, wherein

FIG. 8 shows a time-dependency diagram of a first method for actuating the fast fill valve according to a first example design; and FIG. 9 shows a time-dependency diagram of a second method for actuating the fast fill valve according to a second example design.

DETAILED DESCRIPTION

Figure 1:
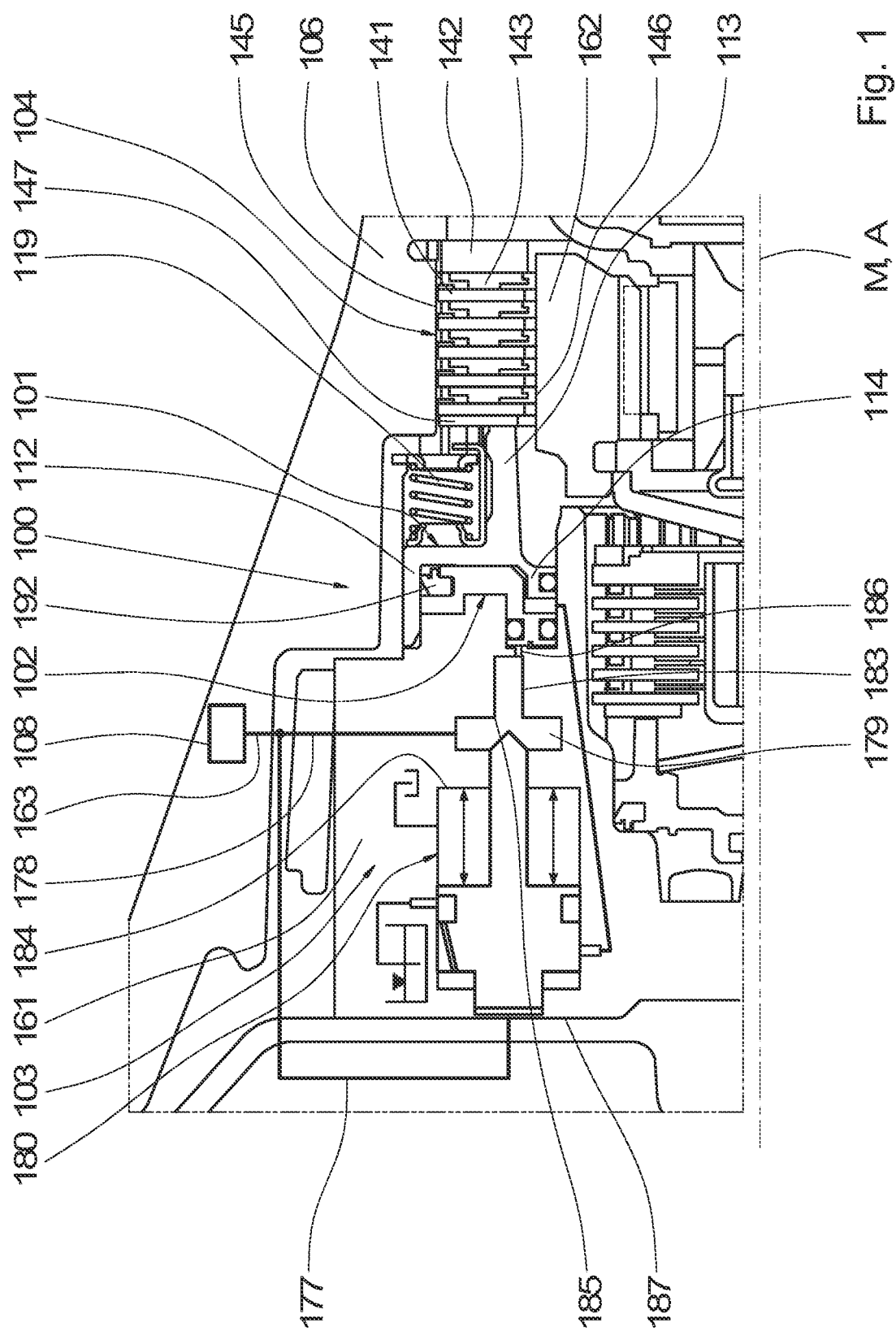
FIG. 1 shows an embodiment of a shift element according to example aspects of the invention as a transmission brake in a partial section of an automatic transmission.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Figure 2:
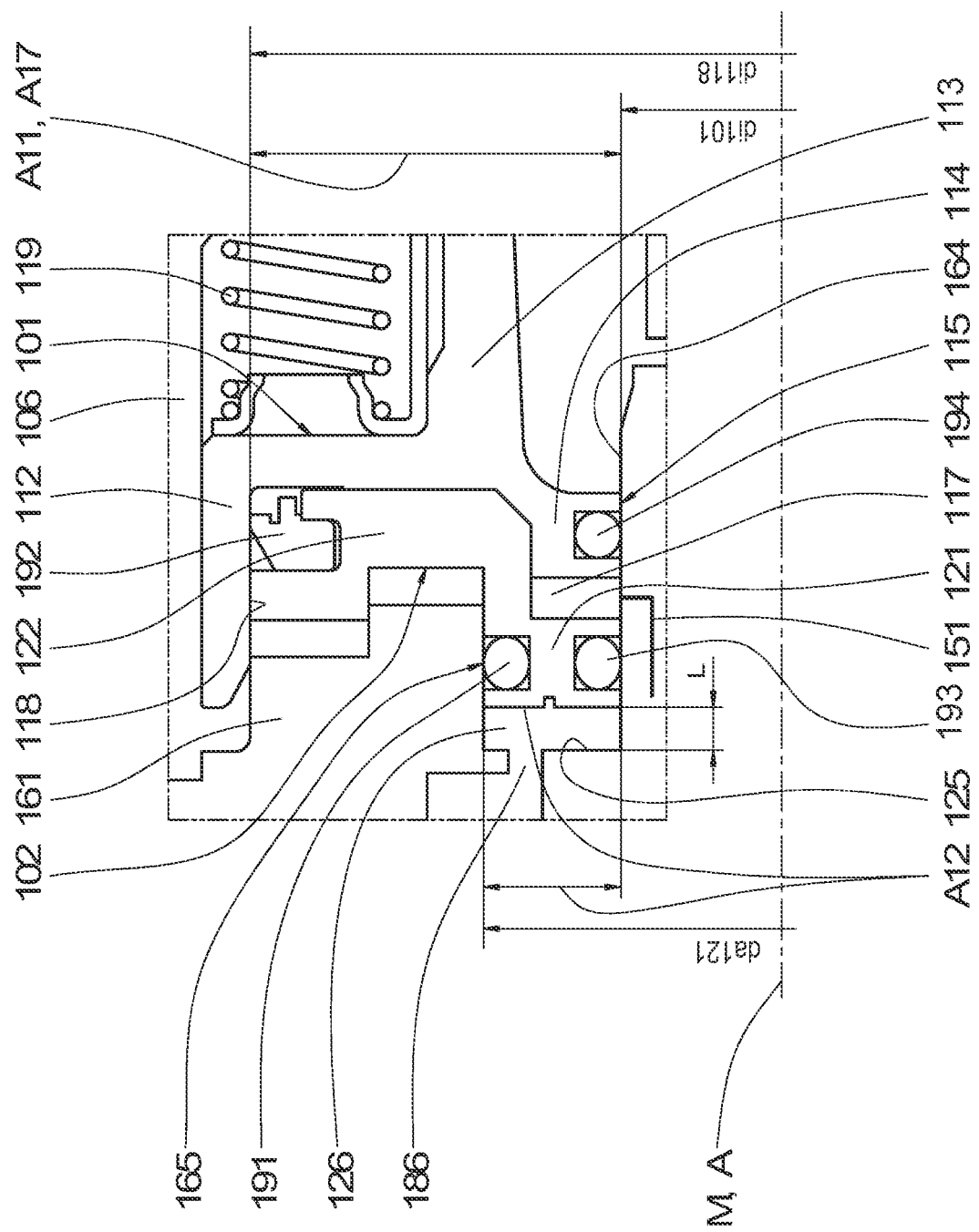
FIG. 2 shows a partial section of the shift element.

In FIG. 1, an embodiment of a shift element 100 according to example aspects of the invention as a transmission brake is shown in a diagrammatic longitudinal sectional representation through a portion of an automatic transmission. FIG. 2 shows, in an enlarged section, elements of the shift element 100. The shift element 100 includes a clutch piston 101, a fast fill piston 102, at least one fast fill valve 103, a disk pack 104, and multiple clutch springs 119. The fast fill valve 103 is represented in detail in a diagrammatic section drawing in FIGS. 3 and 4.

The supply of the shift element 100 with an operating medium—usually transmission oil—takes place from a hydraulic control unit 108 acting as a pressurized oil source, in which the particular pressure is set by pressurized oil sources (not shown). The delivery of the operating medium to the hydraulic control unit 108 takes place by a transmission pump, which generates the pressure and flow of the operating medium.

The hydraulic control unit 108 is connected by a line 163 to a connection pressure chamber 179, which is arranged between the fast fill valve 103 and the fast fill piston 102. In addition, the hydraulic control unit 108 is connected by a line 177 to a control pressure chamber 176 of the fast fill valve 103.

The clutch springs are distributed at the circumference of the clutch piston 101, although only the clutch spring 119 is turned into the plane of the drawing in the representation in FIG. 1. Alternatively, the multiple clutch springs could be designed as a plate spring. The disk pack 104 includes a wave spring 147, five outer clutch disks 141 and one outer clutch disk 142 as well as five inner clutch disks 143. The outer clutch disks 141 and 142 are coupled in a rotationally fixed manner to an outer disk carrier 145, which is formed at a transmission housing 106. The inner clutch disks 143 are coupled in a rotationally fixed manner to an inner disk carrier 146, which is formed at a rotary ring gear 162. The shift element 100 can therefore rotationally fix a rotary transmission component, namely the ring gear 162, to the transmission housing 106, and so the shift element 100 is designed as a transmission brake.

The clutch piston 101, which is also shown in the longitudinal section, is arranged between a housing element 161, which is fixedly connected to the transmission housing 106, and the disk pack 104. A housing element is to be understood in the following as a component of the transmission, which is formed at the transmission housing or is fixedly connected thereto. The clutch springs 119 are arranged between the clutch piston 101 and the disk pack 104. The clutch piston 101 is displaceably guided at the housing element 161 in an axial manner, i.e., in the direction of the central axis M. The central axis M is identical to an axis of rotation A of the transmission housing 106, about which the shafts of the automatic transmission rotate.

In FIG. 2, the actuating elements that can transmit a force onto the disk pack 104 are represented in detail in a partial section of the shift element 100. The clutch piston 101 is designed to be essentially rotationally symmetrical and annular and extends, in the manner of a hollow cylinder, toward two sides in the axial direction. In the direction of the housing element 161, an at least partially hollow cylindrical guide piece 112 and, in the direction of the disk pack 104 (see FIG. 1), an at least partially hollow cylindrical contact pressure piece 113 are formed at the clutch piston 101. The guide piece 112 has an inner contour 118 having an inner diameter $di118$. A central piece 114 of the clutch piston 101 has a circular passage 115 having an inner diameter $di101$, wherein the clutch piston 101 having the passage 115 is axially displaceably guided on a cylindrical radial outer contour 164 of the housing element 161. The clutch piston 101 has, in an axial projection, a circular ring-shaped hydraulic pressure surface A11, the inner diameter of which corresponds to the inner diameter $di101$ and the outer diameter of which corresponds to the inner diameter $di118$ of the inner contour 118. The surface area of the hydraulic pressure surface A11 is as calculated as $A11=\pi*(di118-di101)^2/4$. A sealing element, which is designed as an O-ring 194 in the example embodiment shown, is arranged at the clutch piston 101 at the contact point with the outer contour 164.

In the axial direction, the fast fill piston 102 is arranged between the clutch piston 101 and the housing element 161 coaxially to the clutch piston 101 and is also axially movably guided on the outer contour 164. The fast fill piston 102 is essentially annularly designed and stepped in the axial direction, wherein the fast fill piston 102 includes, radially, an inner portion 121 and an outer portion 122. With respect to the radial position, the fast fill piston 102 is arranged between the outer contour 164 and an inner contour 118 of the guide piece 112 of the clutch piston 101.

A sealing element designed as a sealing lip 192 is arranged at the radially outer edge of the outer portion 122 and rests against the inner contour 118 of the clutch piston 101. The annular, hollow cylindrical inner portion 121 is axially movably guided in an annular groove 165 formed in the housing element 161 as an axial machined groove and has, in the axial projection, i.e., in the direction of the central axis M of the annular fast fill piston 102, a circular ring-shaped hydraulic pressure surface A12, which is calculated from an outer diameter $da121$ and an inner diameter of the inner portion 121. Since the fast fill piston 102 as well as the clutch piston 101 are guided at the outer contour 164, the fast fill piston 102 and the clutch piston 101 have the same inner diameter $di101$, and so the inner diameter of the inner portion 121 corresponds to the inner diameter $di101$. Therefore, the surface area of the hydraulic pressure surface A12 is calculated as $A12=\pi*(da121-di101)^2/4$. The hydraulic pressure surface A12 is smaller than the hydraulic pressure surface A11. The quotient of the hydraulic pressure surfaces A12 and A11 is an area ratio $a11$ with $a11=A12/A11$. In practical applications, an advantageous example embodiment has an area ratio $a11$ of $a11=1:2.95=0.34$.

Radially outward and inward, the inner portion 121 has a sealing element designed as an O-ring 191 and an O-ring 193 in the outer surface and inner surface, respectively, which rest against the groove flanks of the annular groove 165. The inner groove flank is a section of the outer contour 164 of the housing element 161. A fast fill pressure chamber 126, the volume of which changes with the axial movement of the fast fill piston 102, is formed between a groove base 125, the groove flanks, and the hydraulic pressure surface A12. A clutch pressure chamber 117, the volume of which is variable during an axial relative movement of the fast fill piston 102 and the clutch piston 101 relative to each other, is formed between the fast fill piston 102 and the clutch piston 101.

In the non-actuated condition of the shift element 100, the clutch piston 101 is pressed against the fast fill piston 102 by the clutch springs 119 preloaded against the transmission housing 106 or a transmission component fixedly connected thereto. The fast fill piston 102, in turn, is pressed against the housing element 161. The clutch piston 101, the fast fill piston 102, and the housing element 161 therefore have direct mechanical contact. The volumes of the fast fill pressure chamber 126 and of the clutch pressure chamber 117 each reach minimum values in this position. The disks 141, 142, 143, and 147 of the disk pack 104, in the non-actuated condition of the shift element 100, are axially spaced apart or rest loosely against one another, and so the individual axial gaps add up, overall, to a clearance L measured in the axial direction. The contact pressure piece 113 of the clutch piston 101 is spaced apart from the disk pack 104 or rests against the disk pack 104, without exerting a considerable action of force thereon. A torque is not transmittable in the "non-actuated condition". At best, a drag torque can arise due to mechanical friction and/or shearing forces of the operating medium adhering at the disks of the disk pack 104. No pressures act on the shift element 100 or the pressures are below a certain threshold value such as, for example, a pre-filling pressure, which does not yet enable an actuation for a torque transmission.

Figure 3:
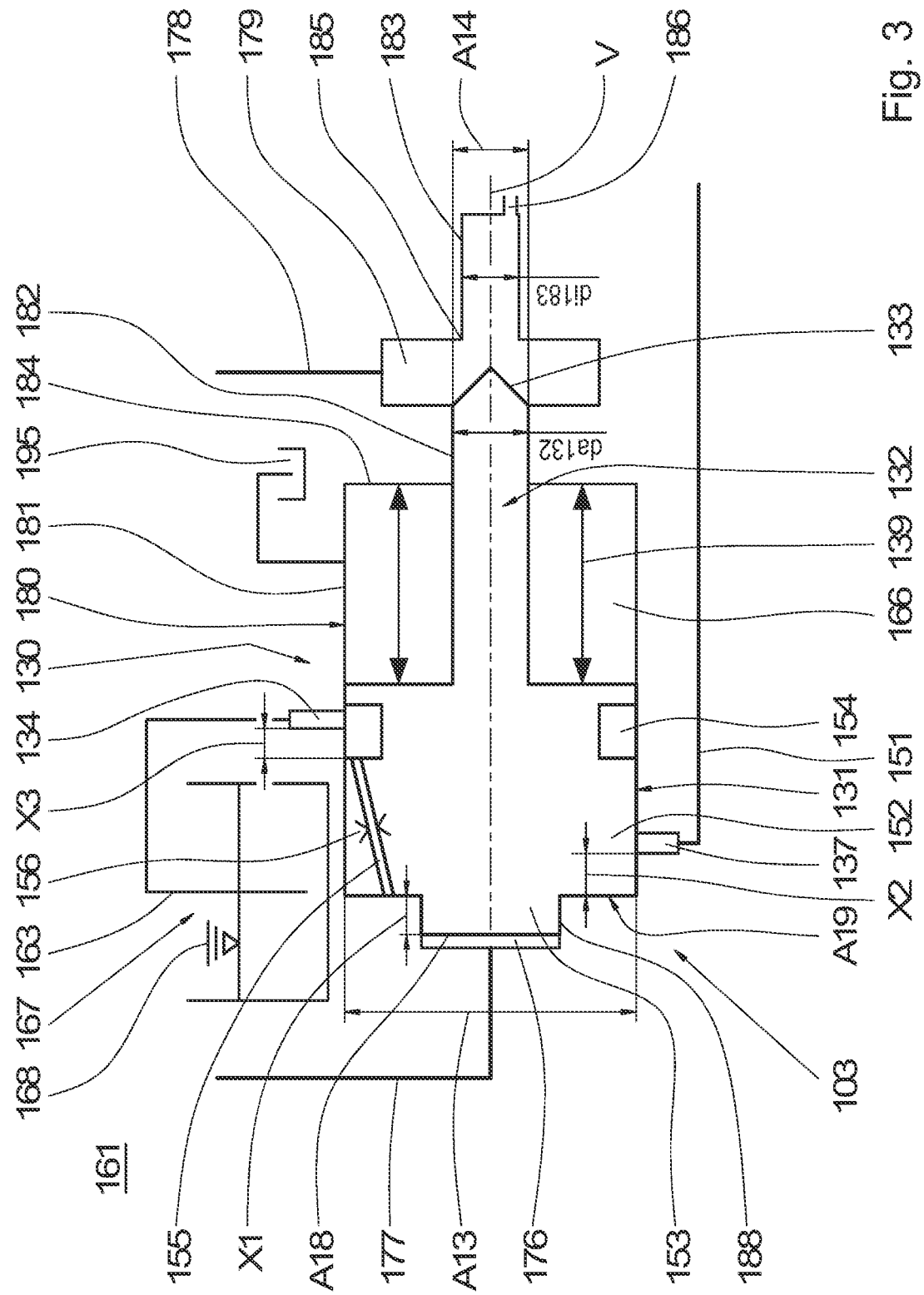
FIG. 3 shows a partial section of a fast fill valve of the shift element according to example aspects of the invention in a first stop position.
Figure 4:
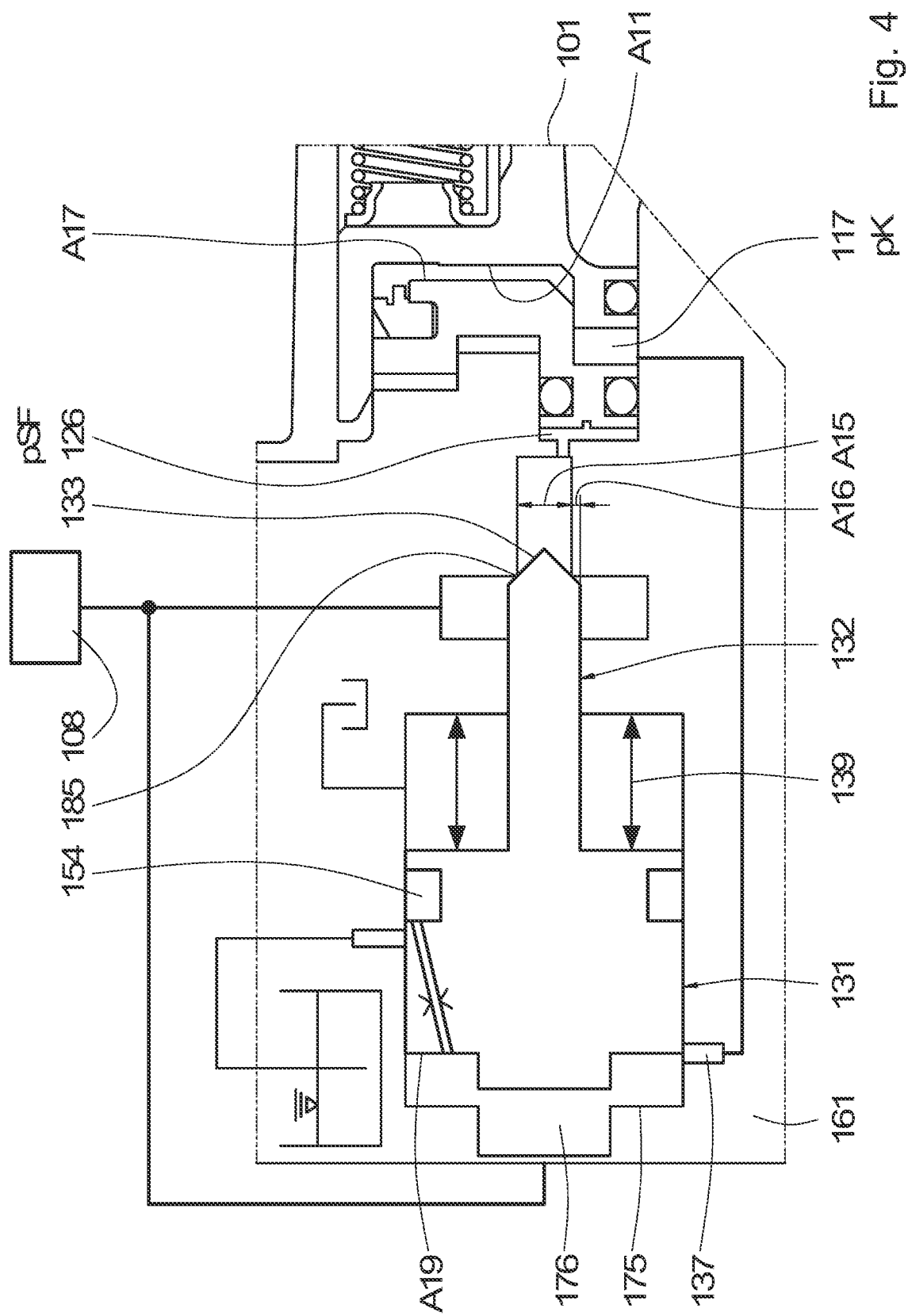
FIG. 4 shows a partial section of the fast fill valve of the shift element according to example aspects of the invention in a second stop position.

The fast fill valve 103 is arranged adjacent to the clutch piston 101 and the fast fill piston 102 and is shown in detail in FIGS. 3 and 4 in a diagrammatic and non-full-scale representation in a first stop position and a second stop position. The fast fill valve 103 includes a valve housing, a valve spool 130, and a compression spring 139. The compression spring 139 is diagrammatically represented as a double arrow. The housing element 161 acts as a valve housing, in which a valve bore 180 is formed as a stepped bore around a valve bore axis V.

The valve bore 180 has four bore sections 181, 182, 183, and 188 having different inner diameters, wherein the bore section 183 is formed at one end and the bore section 188 is formed at the other end of the valve bore 180. The inner diameter of the bore section 181 is the largest, and an inner diameter di183 of the bore section 183 is the smallest. The transition from the first bore section 181 to the second bore section 182 forms a shoulder 184 and the transition from the second bore section 182 to the third bore section 183 forms a valve seat 185, which also has the inner diameter di183. The inner diameter of the bore section 182 is larger than the inner diameter di183. The valve bore 180 is penetrated by a connection pressure chamber 179 between the bore sections 182 and 183.

The third bore section 183 is connected to the annular groove 165 by a connecting duct 186. The connecting duct 186 can be designed, for example, as a bore hole, as a cast-in duct, or as a milled recess. The transition from the bore section 181 to the bore section 188 forms a shoulder 189, which is designed as a circular ring-shaped surface in a radial plane.

A connecting aperture 134, to which a line 163 connects, which extends into an oil reservoir 167, opens radially from the outside into the valve bore 180 in the bore section 181. The oil reservoir 167 is filled with the operating medium, usually transmission oil, up to a certain fill level 168. The end of the line 163 is arranged below the fill level 168 of the operating medium. Besides the connecting aperture 134, a control aperture 137 opens radially from the outside into the valve bore at another axial position of the bore section 181. The control aperture 137 is connected by a line 151 to the clutch pressure chamber 117 (see FIG. 2).

The fast fill valve 103 is a combination of a seat valve and a slide valve. Multiple fast fill valves can be distributed on the circumference, in order to enlarge the flow cross-section to the fast fill pressure chamber 126, and so the fast fill pressure chamber 126 can be more rapidly filled by a greater flow. In addition, a non-uniform distribution of the fast fill pressure pSF over the circumference can therefore be avoided.

The valve spool 130 (see FIGS. 3 and 4) includes a sealing body 132 and a control body 131. The outer contour of the control body 131 is formed by two cylindrical control body sections 152 and 153, wherein the first control body section 152 has a larger outer diameter than the second control body section 153.

The transition from the first control body section 152 to the second control body section 153 forms an annular surface, acting as a hydraulic pressure surface A19, in a radial plane. A leading edge 135 is formed at the control body section 152 at the outer contour at the axial position of the pressure surface A19. The leading edge 135 interacts with the control aperture 137 during the operation of the fast fill valve 103.

The end face of the second control body section 153 at the end of the control body 131 acts as a hydraulic pressure surface A18. The sum of the hydraulic pressure surfaces A18 and A19 is a hydraulic pressure surface A13, which is the entire axial projected area of the control body 131. The first control body section 152 is axially displaceably guided in the bore section 181 and the second control body section 153 is axially displaceably guided in the bore section 188. The two control body sections form clearance fits with the respective particular bore sections. The control body section 153 extends, starting from the axial position of the pressure surface A19, by a length X1 to the end, and/or the axial position of the pressure surface A18.

The control body section 152 includes a circumferential control groove 154, which is designed, for example, as a machined groove or a recess into the lateral surface of the control body section 152. A compensation duct 155 is formed in the control body 131 between the control groove 154 and the pressure surface A19 and can be designed, for example, as a bore hole or as a cast-in duct. In the compensation duct 155, a hydraulic resistance can be optionally provided, for example, in the form of an orifice 156. This resistance would increase the displacement resistance of the control body 131 out of the first stop position and, thereby, limit the displacement speed. Alternatively, a restrictor section or, as the simplest example variant, a small bore diameter, would also be possible.

The sealing body 132 is arranged on the side of the control body 131 opposite the control body section 153. In the example embodiment of the valve spool 130 shown in FIG. 3, the control body 131 and the sealing body 132 are designed as one piece. The cylindrical sealing body 132 has an outer diameter da132, which is smaller than the diameter of the second control body section 153. A cone point 133 is formed at the end of the sealing body 132. In the housing element 161, the sealing body 132 is axially displaceably guided in a bore section 182 of the valve bore 180. The lateral surface of the sealing body 132 and the bore section 182 form a clearance fit.

In the representation from FIG. 3, the valve spool 130 is shown in a first stop position, which is assumed, for example, before an actuation of the shift element 100, or when the shift element 100 is not actuated at all. A compression spring 139 is arranged in a spring chamber 166, between the control body 131 and the housing element 161, at the side of the sealing body 132, concentrically to the sealing body 132. The compression spring 139 presses the valve spool 130 into the first stop position when the pressure in the control pressure chamber is below a certain value. The spring chamber 166 is bled, i.e., the spring chamber 166 is connected to a non-pressurized region 195 of the transmission, and so ambient pressure p0 at least approximately prevails in the spring chamber 166. On the side of the valve spool 130 facing away from the sealing body 132, a control pressure chamber 176 is formed between the control body 131 and the housing element 161, which changes volume depending on the axial distance of the control body 131 during displacement in the axial direction. The line 177 from the hydraulic control unit 108 empties into the control pressure chamber 176. In the first stop position, the control body 131 rests with pressure surface A19 against a stop surface 175 of the housing element 161.

In the first stop position of the valve spool 130, elements of the valve spool 130 assume the following positions: the control body section 153 has entered the bore section 188 with the full length X1. The control body section 152 seals off the control aperture 137 and, thereby, the line 151, which extends to the clutch pressure chamber 117, and so only a pre-filling pressure p1 prevails therein. The control groove 154 and the connecting aperture 134 overlap, and so the control groove 154 is connected by the line 163 to the operating medium in the oil reservoir 167. The volume of the spring chamber 166 is at a maximum. The preload force of the compression spring 139 assumes a lowest value. The cone point 133 of the sealing body 132 is maximally spaced apart from the valve seat 185, and so the bore section 183 and, thereby, the fast fill pressure chamber 126 are connected to the pressurized oil source 108. Therefore, in the first stop position, the fast fill pressure chamber 126 can be filled by the pressurized oil source 108 when the shift element 100 is to be actuated.

FIG. 4 shows, in a schematic, the valve spool 130 in the second stop position. This is reached when the cone point 133 of the sealing body 132 rests against the valve seat 185 and, thereby, seals off the fast fill pressure chamber 126 with respect to the rest of the hydraulic system. The pressure enclosed in the fast fill pressure chamber 126 acts via a pressure surface A15 on the sealing body 132. The circular pressure surface A15 is calculated from the inner diameter di183 of the bore section 183 and/or the inner diameter of the valve seat 185. Additionally, a pressure set by the pressurized oil source 108, such as, for example, a clutch pressure pK, still acts via an annular pressure surface A16, which is situated radially outside the valve seat 185, on the cone point 133 of the valve spool 130. In the second stop position of the valve spool 130, the control body 131 assumes a position, in which the control pressure chamber 176 has maximum volume, since an additional volume was added in the area of the pressure surface A19 when the control body section 153 emerged from the bore section 188, and so now the entire pressure surface A13 can be acted upon by the hydraulic control unit 108. The leading edge 135 passed the control aperture 137 on the way into the second stop position, and so the control body section 152 no longer seals the control aperture 137 off and the clutch pressure chamber 117 is connected to the pressurized oil source 108 by the fast fill pressure chamber 175 and the line 177, and the clutch piston 101 can be acted upon by pressure via the clutch pressure chamber 117.

When the control body 131 moves out of the first stop position into the second stop position, three conditions must be ensured. On the one hand, the fast fill pressure chamber 126 must be sealed off by the sealing body 132 before the leading edge 135 of the control body section 152 releases the control aperture 137. On the other hand, the control body section 153 must have left the bore section 188 before the leading edge 135 of the control body section 152 releases the control aperture 137. For this reason, in the first stop position, an axial distance X2 between the leading edge 135 and the control aperture 137 must be greater than the length X1.

In order to ensure that a short circuit does not exist between the pressurized oil source 108 and the oil reservoir 167 via the compensation duct 155 in the second stop position, the dimensions of the axial extension of the control groove 154 and the connecting aperture 134 as well as the position of the control groove 154 and the connecting aperture 134 are selected in such a way that the control body section 152, with the outer surface, seals off the connecting aperture 134 in the second stop position. This means that a distance X3 between the end of the compensation duct 155 and the connecting aperture 134 must be smaller than the distance X2.

If the shift element 100 is disengaged again, the pressure in the control pressure chamber 176 is reduced by the hydraulic control unit 108 and the valve spool 130 is pushed back into the first stop position by the force of the compression spring 139.

Figure 5:
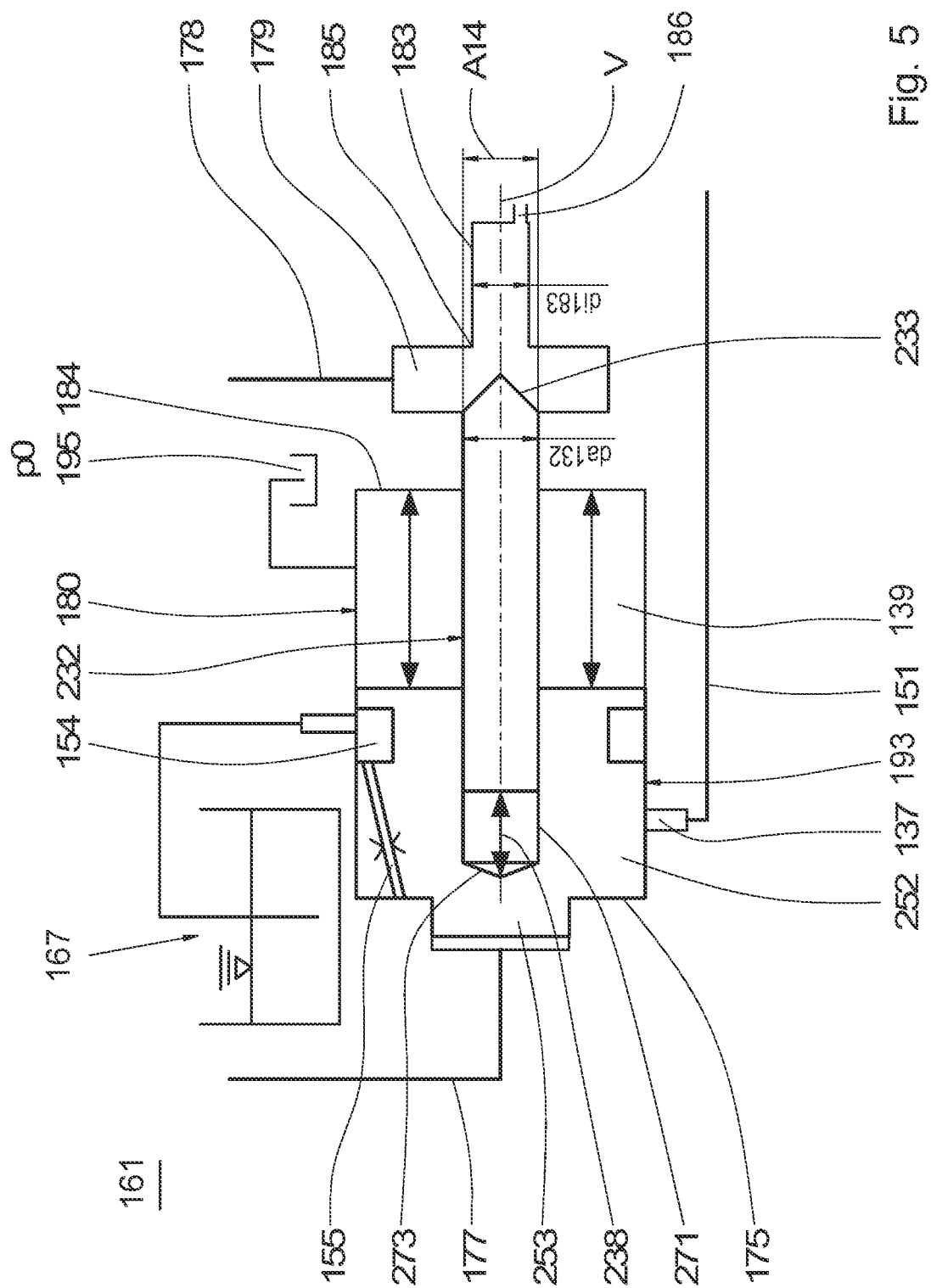
FIG. 5 shows a partial section of a second example variant of a fast fill valve in a first stop position.
Figure 6:
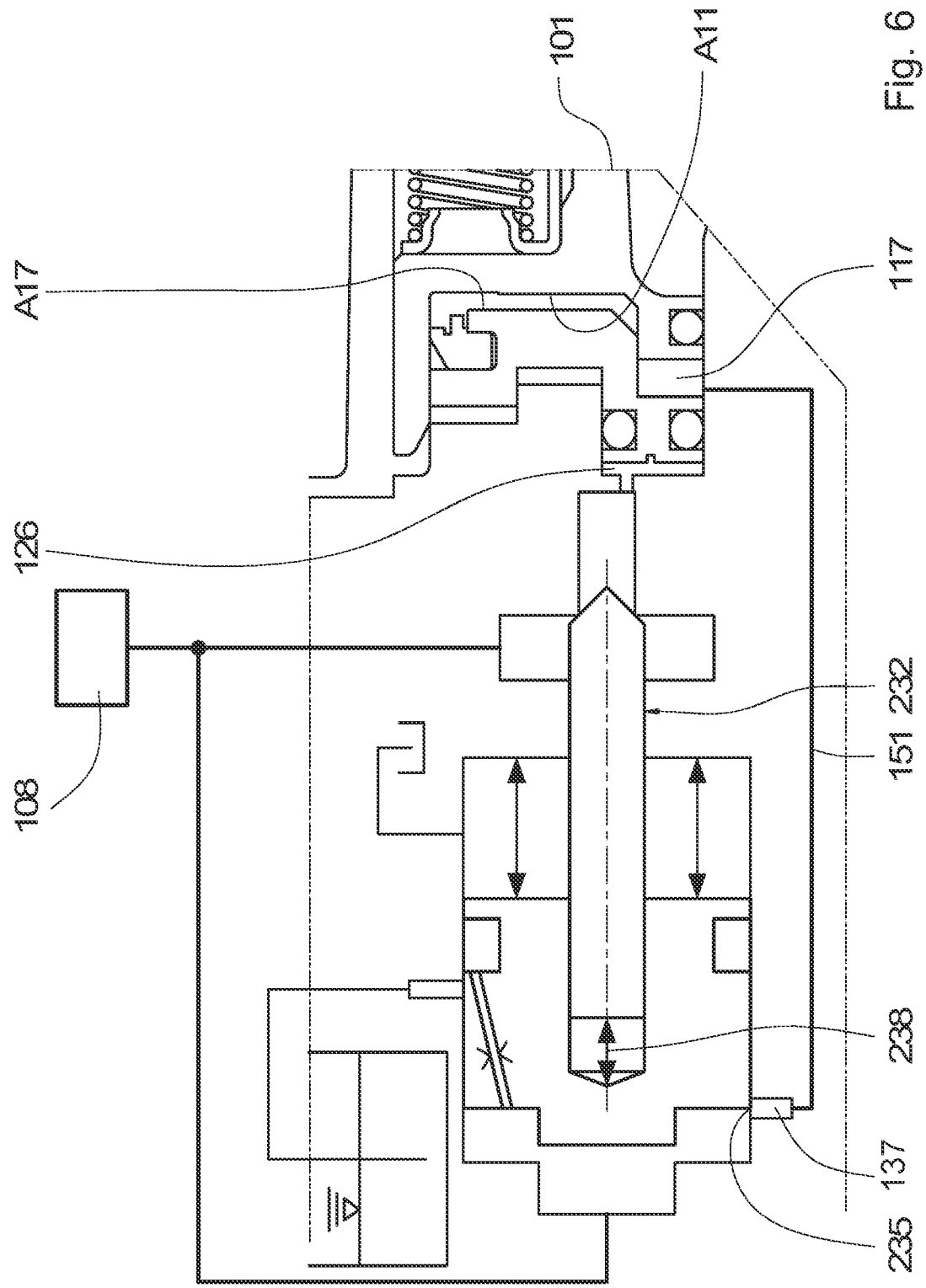
FIG. 6 shows a partial section of the second example variant of the fast fill valve in a second stop position.

FIGS. 5 and 6 show, in a schematic that is also not full-scale, an alternative example embodiment of a fast fill valve 203. This includes a valve spool 230, which, in contrast to the valve spool 130 in FIGS. 3 and 4, is not designed as one piece, but rather in which a control body 231 and a sealing body 232 are two separate components, which are axially displaceable relative to each other. The control body 231 is designed similarly to the control body 131 in FIGS. 3 and 4, although, in contrast thereto, includes a guide bore 271, in which the sealing body 232 is axially displaceably guided in relation to the control body 231. An expanding spring 238 is arranged in a bore base 273, which presses the control body 231 and the sealing body 232 apart from each other. At the sealing body 232, a cone point 233 is formed at the end facing away from the control body 231.

The control body 231, similarly to the control body 131, includes a first control body section 252 and a second control body section 253. Similarly to the control body 131 as well, a control groove 154, a compensation duct 155, and a pressure surface A19 are formed at the control body section 252. The cylindrical control body section 253 adjoins the end of the control body section 252 facing away from the sealing body 232. The mode of operation of the fast fill valves 203 and 103 is identical, in principle. The advantage of the fast fill valve 203 is the decoupling of the control body 231 and the sealing body 232. As a result, the cone point 233 may already rest against the valve seat 185 and seals off the fast fill pressure chamber 126 during the movement of the valve spool 230 into the stop position represented in FIG. 6 before a leading edge 235 unblocks the control aperture 137. After the fast fill pressure chamber 126 has been sealed off, the control body 231 is displaced, due to being acted upon by pressure in the control pressure chamber 176, even further against the sealing body 232, wherein, along this path, the control aperture 137 is unblocked and the clutch pressure chamber 117 is filled. The expanding spring 238 is preloaded until a certain preload force has been reached or, in an alternative example embodiment, the control body 231 and the sealing body 232 rest against each other in direct axial contact. FIG. 6 shows the valve spool 230 in the second stop position, in which the sealing body 232 has been pressed, counter to the force of the expanding spring 238, further into the control body 231 than in the first stop position in FIG. 5.

The advantage of this example embodiment lies in the reliable sealing-off of the fast fill pressure chamber 126 before the clutch pressure chamber 117 is pressurized, regardless of manufacturing tolerances, which can affect the position of the control aperture and the leading edge. It is also not necessary to match up orifices in the lines as described with reference to FIGS. 3 and 4. In contrast thereto, one disadvantage is additional effort related to components and manufacturing steps due to the two-piece design of the control body 231 and the sealing body 232.

Figure 7:
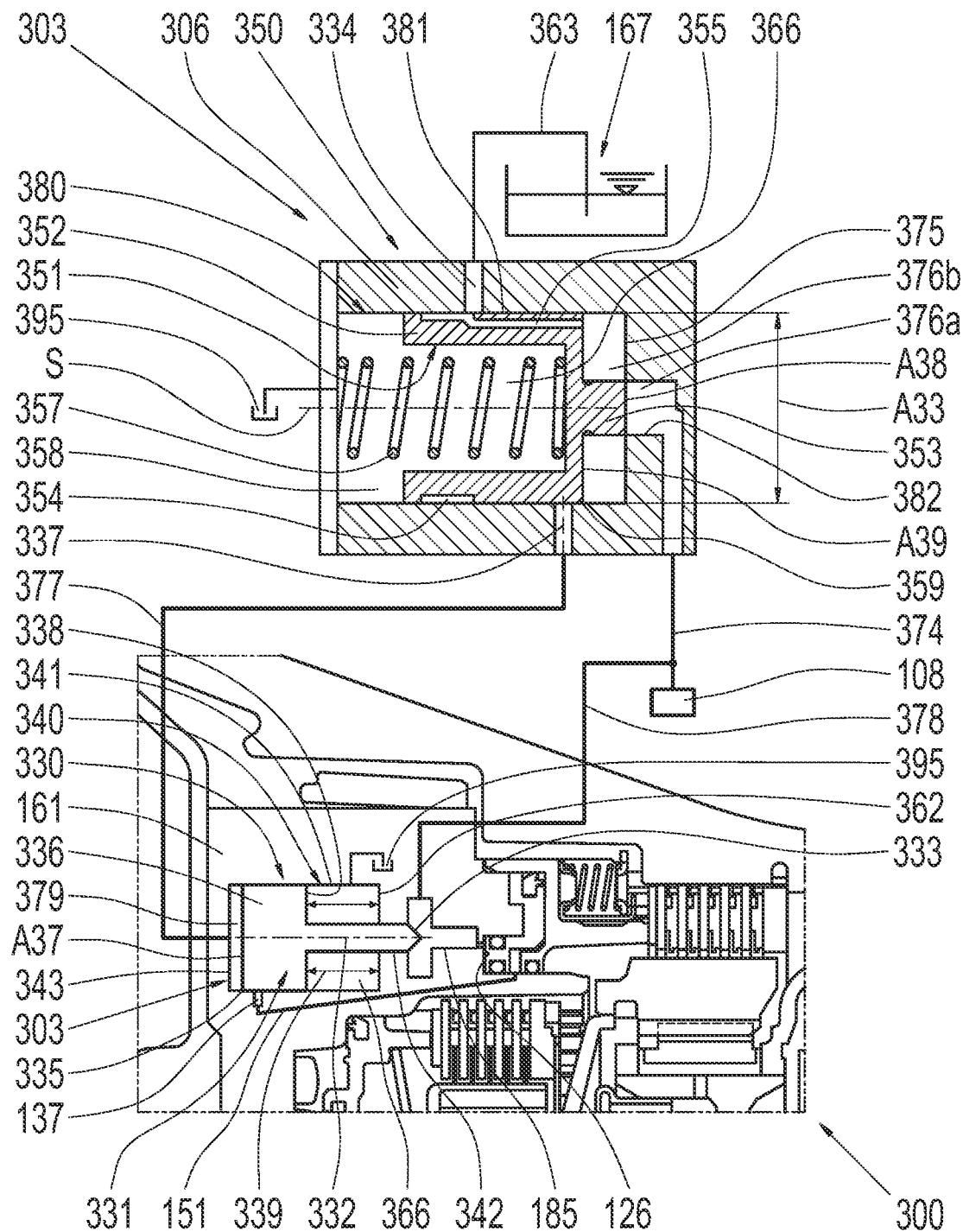
FIG. 7 shows an alternative embodiment of a shift element according to example aspects of the invention with a third example variant of a fast fill valve.

FIG. 7 shows, in a non-full-scale schematic, a fast fill valve 303 as a further alternative example embodiment of a fast fill valve. The fast fill valve 303 has a two-piece design in this case and includes a sealing valve 330 and a control valve 350. The sealing valve 330 includes a sealing body 331 and the control valve 350 includes a control body 351. In contrast to the fast fill valves 103 and 203, the sealing body and the control body are not mechanically, but rather hydraulically coupled to each other. For this reason, the sealing valve 330 and the control valve 350 are spatially separated from each other and freely situatable with respect to position.

The sealing valve 330 includes, in addition to the sealing body 331, a sealing compression spring 339. The stepped piston-shaped sealing body 331 of the sealing valve 330 includes a first cylindrical sealing body section 332 and a second cylindrical sealing body section 336. The outer diameter of the first sealing body section 332 is smaller than the outer diameter of the second sealing body section 336. The stepped transition between the sealing body sections 332 and 336 forms an annular contact surface 338, which is situated in a radial plane, which is perpendicularly penetrated by a central axis of the sealing body 331.

The sealing body 331 is axially displaceably arranged in a sealing valve bore 340, which is designed as a stepped bore. The sealing valve bore 340 includes a first bore section 341 and a second bore section 342 in the housing element 161. The transition between the two bore sections 341 and 342 forms an annular contact surface 362 in the housing element 161. In the installed condition of the sealing body 331, the sealing compression spring 339 is arranged in a preloaded manner between the contact surface 338 of the sealing body 331 and the contact surface 362 of the housing element 161, the preload force of which acts on the sealing body 331 in the direction of a stop surface 343 of the housing element 161. An actuating pressure chamber 379, the volume of which changes with the axial displacement of the sealing body 331, is formed between the second sealing body section 336 and the contact surface. The sealing body section 332 is configured similarly to the sealing body 132 from FIGS. 3 and 4 and includes, at the end facing away from the sealing body section 336, a cone point 333, which, in the installed condition, faces the fast fill pressure chamber 126 and which tightly seals off the fast fill pressure chamber 126 against the valve seat 185 as soon as the sealing body 331 is in the second stop position.

The sealing valve 330 and the control valve 350 are hydraulically connected to each other by a line 377 and a combination of a line 374 and a line 378. The fast fill pressure chamber 126 is supplied, by the line 378, with the operating medium from the pressurized oil source 108 and, in parallel thereto, the control valve 350 is also supplied with the operating medium from the pressurized oil source 108, by the line 374. The sealing valve 330 is arranged between the pressurized oil source 108 and the fast fill pressure chamber 126. The control valve 350 is connected to the actuating pressure chamber 379 of the sealing valve 330 by a control aperture 337 and the line 377. The sealing valve 330 is connected to the fast fill pressure chamber 126 by the control aperture 137 and the line 151, as in the example embodiments in FIGS. 3 through 6.

The sealing body sections 332 and 336 in the exemplary embodiment from FIG. 7 are fixedly connected to each other or designed as one piece. Alternatively, a two-piece embodiment would also be possible, wherein an expanding spring would be arranged between the two sealing body sections 332 and 336 (see FIGS. 5 and 6). The application of pressure onto the sealing body 331 counter to the force of the sealing compression spring 339 takes place by way of the control valve 350 in the actuating pressure chamber 379, where the pressure of the operating medium acts on a hydraulic pressure surface A37 of the sealing body section 336 of the sealing body 331.

The control valve 350 includes a control valve housing 306, a control body 351, and a control compression spring 357. The control body 351 includes a hollow cylindrical control body section 352 and a cylindrical control body section 353, wherein the control body section 353 has a smaller outer diameter than the control body section 352. The outer diameter of the control body section 353 delimits a circular pressure surface A38 in the axial projection. A control pressure chamber 376a, the volume of which changes with the displacement of the control body 351, is formed between the pressure surface A38 and the control valve housing 306. The outer diameters of the control body sections 352 and 353 delimit a pressure surface A39, which is formed by the stepped transition from the control body section 352 to the control body section 353. A control pressure chamber 376b is formed between the pressure surface A39 and the control valve housing 306 and/or the stop surface 375. The pressure surfaces A38 and A39 add up to a pressure surface A33. The control compression spring 357 is arranged in a spring chamber 358 within the hollow cylindrical control body section 351. The spring chamber 358 is connected to a non-pressurized region 395 of the transmission and, thereby, bled.

A circumferential control groove 354, which is manufacturable, for example, as a recess, is formed in the cylindrical outer surface of the control body section 352. A compensation duct 355, which is continuous, i.e., open toward both sides, and is manufactured, for example, as a bore hole, is formed between the control groove 354 and the pressure surface A39. With respect to the compensation duct 355 as well, as with the compensation duct 155 in FIG. 3, the optional arrangement of a hydraulic resistance therein is possible. The control body 351 is axially displaceable counter to the force of the control compression spring 357 in a control valve bore 380 via an application of pressure onto the pressure surface A38 or A33. The control valve housing 306 is designed as a separate housing, as represented. Alternatively, the control valve housing 306 can also be designed within the housing element 161.

The control valve bore 380 is designed as a stepped bore and includes two bore sections 381 and 382, within which the control body 351 is axially displaceably guided. The outer diameters of the particular control body sections 352 and 353 form a clearance fit together with the bore sections 381 and 382, respectively, associated therewith. The stepped transition from the bore section 381 to the bore section 382 forms an annular stop surface 375, which is situated in a radial plane, which is perpendicularly penetrated by a bore axis S of the control valve bore 380. The outer diameter of the pressure surface A39 forms a leading edge 359. A connecting aperture 334 and the control aperture 337 open into the bore section 381 of the control valve bore 380 radially from the outside. The connecting aperture 334 is connected by a line 363 to the oil reservoir 167, wherein the end of the line 363 is situated below the fill level of the oil reservoir 167, as is the case with the line 163 in FIG. 3.

The control body 351 is axially displaceable between two stop positions. In FIG. 7, the control body 351 is represented in a position between the two stop positions, wherein the control body 351 has been displaced, under the effect of a hydraulic pressure, counter to the force of the control compression spring 357 so far that the control body section 353 just emerges from the bore section 382.

In a rest condition, if no actuation of the shift element 300 is intended and the pressure set by the hydraulic control unit 108 in the lines 374 and 378 corresponds only to a pre-filling pressure p1 or the ambient pressure p0, the control body 351 rests against the stop surface 375 of the control valve housing 306, with the pressure surface A39, under the preload force of the control compression spring 357. The volume of the control pressure chamber 376 reaches minimum. The connecting aperture 334 and, thereby, the oil reservoir 167, are connected by the control groove 354 and the compensation duct 355 to the control pressure chamber 376 between the pressure surface A39 and the stop surface 375.

If, in the case of a gear shift to be initiated, the pressure in the lines 374 and 378 as well as in the fast fill pressure chamber 126 and the control pressure chamber 376a is now increased by a pressure-adjusting device of the hydraulic control unit acting as the pressurized oil source 108, the pressure acts in the control valve 350 on the pressure surface A38 of the control body 351 and on the fast fill piston 102. The processes in the fast fill pressure chamber 126 take place as previously described with reference to FIGS. 3 through 6 and 8 and 9.

During an increase in the fast fill pressure pSF, the control body 351 is displaced, at a certain pressure value, counter to the force of the control compression spring 357, while, as described with reference to FIGS. 3 through 6 and FIGS. 8 and 9, the fast fill pressure chamber 126 is filled and the fast fill piston 102 is acted upon by pressure and displaced against the clutch piston 101. For as long as the control body section 353 is guided within the bore section 382 during the movement of the control body 351 out of its stop position, the volume of the control pressure chamber 376b increases between the pressure surface A39 and the stop surface 375. A low pressure arising as a result in this portion of the control pressure chamber 376 is compensated for, in that the chamber between the pressure surface A39 and the stop surface 375 is filled with the operating medium through the connecting aperture 334, the control groove 354, and the compensation duct 355.

As soon as the control body section 353 leaves the bore section 382, the control pressure chambers 376a and 376b add up to the control pressure chamber 376 and the pressurizable surface of the control body 351 enlarges from the pressure surface A38 to the considerably larger pressure surface A33. The force on the control body 351 counter to the force of the control compression spring 357 increases in proportion to the enlargement of the pressure surface, and so the control body 351 is displaced into a second stop position. During this movement, after the control body section 353 has emerged from the bore section 382, the control aperture 337 is opened by the leading edge 359 of the control body 351, and so the fast fill pressure pSF prevailing in the control pressure chamber 376 can act, through the line 377, upon the actuating pressure chamber 379 of the sealing body 331 and, thereby, upon the pressure surface A37. The axial positions of the control groove 354, the leading edge 359, the control aperture 337, and the connecting aperture 334 are selected in such a way that the connecting aperture 334 is closed by the control body section 352 before the control aperture 337 is opened. If this were not selected in this way, the pressure in the control pressure chamber 376 would drop, because the operating medium could escape through the compensation duct 355 into the oil reservoir 167.

Due to the opening of the control aperture 337 and the resultant pressurization of the actuating pressure chamber 379, the sealing body 331 is displaced (similarly to the process in FIGS. 3 and 4) counter to the force of the sealing compression spring 339 into a second stop position, in which the sealing body section 332 seals off the fast fill pressure chamber 126. On the way into the second stop position or when the second stop position has been reached, the sealing body section 336, with the leading edge 335, unblocks the control aperture 137 and the correspondingly changed pressure (see FIGS. 8 and 9) now acts upon the clutch pressure chamber 117 and, thereby, the clutch piston 101.

The synchronization of the sealing valve 330 in such a way that the fast fill pressure chamber 126 is securely sealed off and the fast fill pressure pSF is securely enclosed can take place, as described with reference to FIGS. 3 and 4, via the selection of the axial positions of the control aperture 137 and of the leading edge 335 of the sealing body 331. Additionally, a synchronization is still possible via the arrangement of hydraulic resistances in the form of restrictors or orifices in the lines 151, 374, 378, and 377. Alternatively, a secure seal of the fast fill pressure chamber 126 can be achieved before the clutch pressure chamber 117 is pressurized, in that the sealing body 331 is designed as two pieces, similarly to FIGS. 5 and 6.

The surface area of the pressure surface A33 and the force of the control compression spring 357 are selected in such a way that the control aperture 337 of the control valve 350 remains open also during a reduction of the pressure set by the pressurized oil source 108 during the filling of the clutch pressure chamber 117.

The manner in which the rapid filling takes place and which processes take place in the fast fill valve 103 and in the activation from the pressurized oil source 108 is described in the following with reference to the time-dependency diagrams in FIGS. 8 and 9 viewed in combination with FIGS. 3 and 4. FIG. 8 shows a first example method for actuating the rapid filling. At a point in time t0 before the actuation of the shift element 100, the valve spool 130 is represented in the first stop position as in FIG. 3. The actuation of a shift element is also referred to in the following as a gear shift. The ring gear 162 still rotates freely with respect to the transmission housing 106 (see FIG. 1). The disk pack 104 is disengaged. The clearance L is present in the axial direction between the disks and the clutch piston 101. The wave spring 147 is relaxed. All pressures downstream from the hydraulic control unit 108 are pressureless or have a pre-filling pressure value p1, which is too low to exert an effect upon the shift element with regard to the transmission of a torque, but is high enough to ensure that all chambers, upon which oil can act, are not empty. In practical applications, this pressure is, for example, a half (0.5) bar to eight-tenths (0.8) bar.

Due to the actuation of the shift element 100 designed as a transmission brake, the ring gear 162 is to be rotationally fixed to the transmission housing 106. At the point in time t0 in FIG. 8, the command is output by an electronic control unit (ECU) (not represented) to the hydraulic control unit 108 to increase the pressure starting from the pre-filling pressure p1 to a specified pressure value p2S. The pressure increase takes place similarly in all areas that are hydraulically connected to each other, i.e., in the control pressure chamber 176 as well as in the connection pressure chamber 179 and the fast fill pressure chamber 126.

The second specified pressure value p2S is not reached by the fast fill pressure pSF, however, since, due to the application of pressure upon the hydraulic pressure surface A12 of the fast fill piston 102 in the fast fill pressure chamber 126, the fast fill piston 102 is pressed against the clutch piston 101 and both are ultimately pressed counter to the force of the clutch springs 119 and the elasticities of the disk pack 104. The fast fill piston 102 and the clutch piston 101 are displaced against the disk pack 104 by the distance of the clearance L. A pressure value p2 sets in downstream from the hydraulic control unit 108 in the fast fill pressure chamber 126 as the fast fill piston 102 starts moving at a point in time t1. The pressure value p2 results from the hydraulic pressure surface A12 and the forces of the clutch springs 119 and, theoretically, from the appropriate elasticities of the disk pack 104 and the wave spring 147. In addition, the volume of the fast fill pressure chamber 126 increases during the movement of the fast fill piston 102 until the clearance L has been eliminated.

Only after the contact pressure piece 113 of the clutch piston 101 comes to rest against the wave spring 147 of the disk pack 104, which is now clearance-free, could the pressure increase, theoretically, in all connected areas—and, thereby, also the fast fill pressure pSF in the fast fill pressure chamber 126—further in the direction of the specified pressure value p2S. Up to a point in time t3, at which the displacement of the fast fill piston 102 has been completed and the clearance L has been eliminated, the pressure constantly corresponds to the pressure value p2. An advantageous pressure value p2 in practical applications is, for example, p2=4.5 bar. The specified pressure value p2S was selected to be considerably higher than the second pressure value p2 to be set, in order to provide, in the appropriate pressurized oil source in the hydraulic control unit 108, a flow cross-section that is as large as possible and, thereby, a flow rate that is as high as possible for the rapid filling of the shift element.

In the control pressure chamber 176, the hydraulic pressure surface A18 and, in the connection pressure chamber 179, the hydraulic pressure surface A14 of the valve spool 130 have the same pressure, which corresponds to the pressure value p2, as the result of which opposed compressive forces arise. Although the hydraulic pressure surface A18 is larger than the hydraulic pressure surface A14, the valve spool 130 remains in the first stop position also when the pressure value p2 is reached. The reason therefor is that, in addition to the compressive force from the hydraulic pressure surface A14, in connection with the pressure value p2, a preload force of the compression spring 139 still opposes the compressive force from the hydraulic pressure surface A18 and the pressure value p2. The preload force of the compression spring 139 and the surface areas of the pressure surfaces A14 and A18 are selected in such a way that the compressive force from the hydraulic pressure surface A18 is exceeded when the pressure value p2 is applied and, therefore, the valve spool 130 remains in the first stop position, while the fast fill pressure chamber 126 is filled through the connecting duct 186 and the hydraulic pressure surface A12 can be acted upon by a fast fill pressure pSF at the level of the pressure value p2 up to the point in time t3.

Before a point in time t3 is reached, at a point in time t2, the specified pressure value pS is reduced to a specified pressure value p3S, which is reached at the point in time t3. The specified pressure value p3S is greater than the pressure value p2 setting in during the rapid filling. An overshooting of the pressure is to be avoided when, at the point in time t3, the rapid filling is completed and the pressure would abruptly increase to the original specified pressure value p2S. Therefore, at the point in time t3, the specified pressure value p3S is set and the pressure increases without pressure peaks at the point in time t3 starting from the pressure value p2. At a point in time t4, a pressure value p3 is reached. The pressure value p3 corresponds to the specified pressure value p3S. The specified pressure value p3S is selected in such a way that the specified pressure value p3S suffices for displacing the valve spool 130 in the direction of the second stop position counter to the forces of the compression spring 139 and the pressure at the level of the pressure value p3 on the hydraulic pressure surface A14.

When the valve spool 130 is displaced out of the first stop position, the chamber enclosed between the pressure surface A19 and the housing element 161 or the stop surface 175 enlarges, and so the pressure in this area would drop below the ambient pressure, as the result of which an additional force would arise on the valve spool 130 in the direction of the first stop position. The compensation duct 155 is provided in order to avoid this. When the pressure between the pressure surface A19 and the stop surface 175 decreases, the operating medium is displaced, by the ambient pressure p0, out of the oil reservoir 167 through the line 163, the connecting aperture 134, the control groove 154, and the compensation duct 155 into the enlarging chamber, and so this chamber is filled. The end of the line 163 must be arranged below the fill level 168 so that the operating medium can be pressed by the ambient pressure p0 into the line 163.

When the valve spool 130 has moved farther than the length X1 in the direction of the second stop position, the control body section 153 leaves the bore section 188, and so the fast fill pressure pSF can now act upon the entire pressure surface A13. As a result, the displacing axial force increases in proportion to the enlargement of the pressure surface and the valve spool 130 is displaced, in an accelerated manner, into the second stop position, in which the sealing body 132 seals off the fast fill compression chamber 126. The control body 131 of the valve spool 130 traverses, with the leading edge 135, the control aperture 137 and, thereby, releases a hydraulic connection by the line 151 to the clutch pressure chamber 117, which can now be filled out of the pressurized oil source 108 and acted upon by pressure. For this reason, the fast fill pressure pSF is reduced, at a point in time t5, to a specified pressure p4S, which is reached at a point in time t6 and which corresponds to a pressure value p4.

The axial positions of the control groove 154, of the control aperture 137, and of the connecting aperture 134 with respect to the leading edge 135 are selected in such a way that the control body 131 opens the control aperture 137 during displacement only if the connecting aperture 134 is sealed off by the control body section 152. As a result, a hydraulic short circuit between the control pressure chamber 176 and the oil reservoir 167 and, thereby, an impression of the fast fill pressure pSF, is avoided. In addition, the distance X2 and the travel xH are to be selected in such a way that the fast fill pressure chamber 126 is sealed off by the sealing body 132 before the clutch pressure chamber 117 is pressurized, since, otherwise, the fast fill piston 102 can be displaced again in the direction of the starting position.

These time characteristics are additionally also settable, theoretically, in that hydraulic resistances in the form of restrictors or orifices are arranged in the lines 151, 177, and/or 178. As a result, a pressure build-up or a pressure drop in the different chambers, such as the fast fill pressure chamber 126, the clutch pressure chamber 117, the connection pressure chamber 179, or the control pressure chamber 176, can be decelerated.

The clutch pressure pK increases from the point in time t6 from the pre-filling pressure p1 prevailing up to that point in the clutch pressure chamber to the pressure value p4, which is reached at a point in time t7. The clutch pressure pK remains at the pressure value p4 until, at a point in time t8, the pressure ramp necessary for the gear change is output by the ECU via the hydraulic control unit 108. During the pressure ramp, the power transmission capacity of the shift element 100 is increased. Since the clutch pressure pK acts via the fast fill piston 102 upon the fast fill pressure chamber 126, the fast fill pressure pSF prevailing there and enclosed by the sealing body 132 increases according to an area ratio a11 of the pressure surfaces A12 and A17. The fast fill pressure pSF increasing by the aforementioned ratio acts via the pressure surface A15 upon the sealing body 132 and, thereby, the valve spool 130. The surface areas of the pressure surfaces A13 and A15 are selected in such a way that the pressure value p4 is sufficient for pressing the sealing body 132 against the valve seat 185 and, thereby, holding the fast fill pressure chamber 126 closed.

FIG. 9 shows, in a time-dependency diagram, an alternative example method for activating the fast fill valve 103. Up to the point in time t4, the activation proceeds identically as in the time-dependency diagram from FIG. 8. In contrast to the example method represented there, the fast fill pressure chamber 126 is not sealed off after the pressure value p3 has been set. Rather, the power transmission capacity of the shift element 100 is further increased by a further increase of the fast fill pressure pSF after a point in time t5'. This is achieved by another configuration of the compression spring 139 and, if necessary, of the surface areas of the pressure surfaces A18 and A14 than is the case with a fast fill valve suitable for the example method according to FIG. 8. The spring force of the compression spring 139 is higher in an example method according to FIG. 9 than that of the compression spring for the example method according to FIG. 8.

As a result, the valve spool 130 or the leading edge 135 does not unblock the control aperture 137 at the point in time t5', either. Rather, the clutch piston 101 is pressed against the disk pack 104 by the fast fill piston 102. Starting at the point in time t5', the fast fill pressure pSF is increased on a ramp until, at a point in time t6', a synchronous pressure value pSYN is exceeded, below which the shift element 100 is engaged and the torque is transmittable without slip via the shift element 100. The halves of the shift element 100 are now connected to each other in a rotationally fixed manner. The spring force of the compression spring 139 and the configuration of the pressure surfaces A18 and A14 are selected in such a way that, first at a point in time t7', a pressure value p5 is reached, which is above the synchronous pressure value pSYN with a sufficient safety margin, and at which the control body section 153 emerges from the bore section 188. Now, the pressure acts with the pressure value p5 upon the considerably larger pressure surface A13, and so, under the proportionally increased compressive force of the fast fill pressure pSF, the valve spool 130 unblocks the control aperture 137 and is displaced into the second stop position. The pressure having the pressure value p5 now acts directly upon the clutch piston 101 and securely holds the shift element 100 engaged. The clutch pressure pK can be even further increased up to a pressure value p6, which is reached at a point in time t8'. The pressure enclosed in the fast fill pressure chamber 126 is increased via the area ratio a11 of the fast fill piston 102 to a pressure value p7.

The example method according to FIG. 9 has the advantage as compared to the example method according to FIG. 8 that pressure is applied onto the clutch piston 101 only if a non-slip frictional connection is established between the shift-element halves, and so the frictional connection cannot be interrupted, nor can an undesirable change of the power transmission capacity of the shift element 100 occur, which would negatively affect the ride comfort.

Theoretically, the example method according to FIG. 8 offers the advantage that the increase of the fast fill pressure pSF to the increased pressure value p3 takes place only for the very short time duration (approximately 50 msec in practical applications) of the rapid filling. This yields a low power consumption of the transmission pump and, thereby, a higher overall efficiency of the transmission as compared to the prior art.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS 100 shift element
101 clutch piston
102 fast fill piston
103 fast fill valve
104 disk pack
106 transmission housing
108 pressurized oil source
112 guide piece
113 contact pressure piece
114 central piece
115 passage
117 clutch pressure chamber
118 inner contour
119 clutch spring, compression spring
121 inner portion
122 outer portion
123 bore base
125 groove base
126 fast fill pressure chamber
130 valve spool
131 control body
132 sealing body
133 cone point
134 connecting aperture
135 leading edge
137 control aperture
139 compression spring
141 outer clutch disks
142 outer clutch disk
143 inner clutch disks
145 outer disk carrier
146 inner disk carrier
147 wave spring
151 line
152 control body section
153 control body section
154 control groove
155 compensation duct
156 orifice
161 housing element
162 ring gear
163 line
164 outer contour of the housing section
165 annular groove
166 spring chamber
167 oil reservoir
168 fill level
171 guide bore
175 stop surface
176 control pressure chamber
177 line
178 line
179 connection pressure chamber 180 valve bore
181 bore section
182 bore section
183 bore section
184 shoulder
185 valve seat
186 connecting duct
188 bore section
191 O-ring, sealing element (clutch piston)
192 sealing lip, sealing element
193 O-ring, sealing element
194 O-ring, sealing element
195 non-pressurized region, bleeding
203 fast fill valve
230 valve spool
231 control body
232 sealing body
233 cone point
238 expanding spring
252 control body section
253 control body section
271 guide bore
273 bore base
300 shift element
303 fast fill valve
306 control valve housing
330 sealing valve
331 sealing body
332 sealing body section
333 cone point
334 connecting aperture
335 leading edge
336 sealing body section
337 control aperture
338 contact surface
339 sealing compression spring
340 sealing valve bore
341 bore section
342 bore section
343 stop surface
350 control valve
351 control body
352 control body section
353 control body section
354 control groove
355 compensation duct
357 control compression spring
358 spring chamber
359 leading edge
362 contact surface
363 line
366 spring chamber
374 line
375 stop surface
376 control pressure chamber
376a control pressure chamber
376b control pressure chamber
377 line
378 line
379 actuating pressure chamber
380 control valve bore
381 bore section
382 bore section
a11 area ratio A12/A11=A12/A17
A automatic transmission axis of rotation
A11 hydraulic pressure surface
A12 hydraulic pressure surface
A13 hydraulic pressure surface
A14 hydraulic pressure surface
A15 hydraulic pressure surface
A16 hydraulic pressure surface
A17 hydraulic pressure surface
A18 hydraulic pressure surface
A19 hydraulic pressure surface
A33 hydraulic pressure surface
A37 hydraulic pressure surface
A38 hydraulic pressure surface
A39 hydraulic pressure surface
da121 outer diameter
da132 outer diameter
di101 inner diameter
di118 inner diameter
di183 inner diameter
L clearance
M clutch piston central axis
p pressure
pK clutch pressure
pS specified pressure profile
pSF fast fill pressure
pSYN synchronous pressure value
p2S specified pressure value
p3S specified pressure value
p4S specified pressure value
p1 pre-filling pressure value
p2 pressure value
p3 pressure value
p4 pressure value
p5 pressure value
p6 pressure value
p7 pressure value
S control valve bore axis
t time
t0 point in time
t1 point in time
t2 point in time
t3 point in time
t4 point in time
t5 point in time
t5' point in time
t6 point in time
t6' point in time
t7 point in time
t7' point in time
t8 point in time
t8' point in time
t9 point in time
X1 length
X2 distance
X3 distance
V valve bore axis

The invention claimed is:

1. A hydraulically actuatable shift element (100, 200, 300), comprising: a clutch piston (101);
a fast fill piston (102);
a valve device (103, 203, 303) comprising a sealing body (132, 232, 331) and a control body (131, 231, 351);
a fast fill pressure chamber (126); and
a clutch pressure chamber (117),
wherein the sealing body (132, 232, 331) is configured such that, prior to actuation of the shift element (100, 200, 300), the sealing body (132, 232, 331) is in a first switching position of the sealing body (132, 232, 331), the fast fill pressure chamber (126) connected to a pressurized oil source (108) in the first switching position of the sealing body (132, 232, 331) such that the fast fill pressure chamber (126) is pressurizable by the pressurized oil source (108), wherein the sealing body (132, 232, 331) is configured such that, during or after actuation of the shift element (100, 200, 300), the sealing body (132, 232, 331) is in a second switching position of the sealing body (132, 232, 331), the sealing body (132, 232, 331) sealing off the fast fill pressure chamber (126) with respect to the rest of a hydraulic system in the second switching position of the sealing body (132, 232, 331), wherein the control body (131, 231, 351) is configured such that, before the actuation of the shift element (100, 200, 300), the control body (131, 231, 351) is in a first switching position of the control body (131, 231, 351), the control body (131, 231, 351) having a first pressure surface (A18, A38) upon which pressure from the pressurized oil source (108) is applicable in the first switching position of the control body (131, 231, 351), wherein the control body (131, 231, 351) is configured such that, before or after the actuation of the shift element (100, 200, 300), the control body (131, 231, 351) is in a second switching position of the control body (131, 231, 351), wherein the control body (131, 231, 351) has a second pressure surface (A19, A39), and the valve device (103, 203, 303) is configured such that, in the second switching position of the control body (131, 231, 351) or between the first switching position and the second switching position of the control body (131, 231, 351), pressure is applicable to the second pressure surface (A19, A39) and the first pressure surface (A18, A38).

2. The shift element of claim 1, wherein the control body (131) is fixedly connected to the sealing body (132).

3. The shift element of claim 2, wherein, in the second switching position of the control body (131, 231), the clutch pressure chamber (117) is connected to the pressurized oil source (108) such that pressure from the pressurized oil source (108) is applicable on the clutch piston (101).

4. The shift element of claim 1, wherein the control body (231, 351) and the sealing body (232, 331) are separate components.

5. The shift element of claim 4, wherein the control body (231) is mechanically coupled to the sealing body (232), and the control body (231) is axially displaceable relative to the sealing body (232).

6. The shift element of claim 5, further comprising an expanding spring (238) arranged between the control body (231) and the sealing body (232).

7. The shift element of claim 4, wherein, in the second switching position of the control body (131, 231), the clutch pressure chamber (117) is connected to the pressurized oil source (108) such that pressure from the pressurized oil source (108) is applicable on the clutch piston (101).

8. The shift element of claim 4, wherein the control body (351) and the sealing body (331) are hydraulically coupled.

9. The shift element of claim 8, wherein:
the control body (351) is configured such that the control body (351) interrupts a hydraulic connection between the pressurized oil source (108) and the sealing body (331) in the first switching position of the control body (351);
the control body (351) is configured such that, in the second switching position of the control body (351), the control body (351) establishes a hydraulic connection between the pressurized oil source (108) and the sealing body (331) whereby pressure is applicable upon the sealing body (331) to displace the sealing body (331) into the second switching position of the sealing body (331); and
in the second switching position of the sealing body (331) and in the second switching position of the control body (351), the clutch pressure chamber (117) is hydraulically connected to the pressurized oil source (108).

10. The shift element of claim 8, wherein the control body (351) is spatially separated from the sealing body (331).

11. The shift element of one of claim 8, further comprising a control compression spring (357) and a sealing compression spring (339), wherein:
the control body (351) is urged towards the first switching position of the control body (351) by the force of the control compression spring (357); the sealing body (331) is urged towards the first switching position of the sealing body (331) by the force of the sealing compression spring (339); and
under the application of pressure from the pressurized oil source (108), the control body (351) is displaceable against the force of the control compression spring (357) and the sealing body (331) is displaceable against the force of the sealing compression spring (339) into section switching positions.

12. The shift element of claim 11, wherein the sealing body (331) is configured such that, starting from the first switching position of the sealing body (331), the sealing body (331) is connected in an actuating pressure chamber (379) to the pressurized oil source (108) and, thereby, pressure is applicable upon the sealing body (331) when the control body (351) is in the second switching position of the control body (351).

13. The shift element of claim 11, wherein a surface area of the first pressure surface (A38) of the control body (351), the force of the control compression spring (357), surface areas of pressure surfaces (A37) of the sealing body (331), and the force of the sealing compression spring (339) are selected such that, during operation of the shift element, the control body (351) and the sealing body (331) are displaceable into the second switching positions only when a magnitude of the fast fill pressure (pSF) is great enough to eliminate a clearance (L) between axially spaced disks (141, 142, 143, 147) of a disk pack (104).

14. The shift element of claim 11, wherein a surface area of a first pressure surface (A38) of the control body (351), the force of the control compression spring (357), surface areas of pressure surfaces (A37) of the sealing body (331), and the force of the sealing compression spring (339) are selected such that, during operation of the shift element, the control body (351) and the sealing body (331) are displaceable into the second switching positions only when a synchronous pressure value (pSYN) is exceeded, torque being transmittable through the shift element without slip at the synchronous pressure value (pSYN).

15. The shift element of claim 1, wherein surface areas of pressure surfaces (A18, A19, A14) of the control body (131, 231) and the sealing body (132, 232) and the force of a compression spring (139) are selected such that, during operation of the shift element, the control body (131, 231) is displaceable into a position in which the control body (131, 231) unblocks a connection from the pressurized oil source (108) to the clutch pressure chamber (117) only when a magnitude of the fast fill pressure (pSF) is great enough to eliminate a clearance (L) between axially spaced disks (141, 142, 143, 147) of a disk pack (104).

16. The shift element of claim 1, wherein surface areas of pressure surfaces (A18, A19, A14) of the control body (131, 231) and the sealing body (132, 232) and the force of a compression spring (139) are selected such that, during operation of the shift element, the control body (131, 231) is displaceable into a position in which the control body (131, 231) unblocks a connection from the pressurized oil source (108) to the clutch pressure chamber (117), only when a synchronous pressure value (pSYN) is exceeded, torque being transmittable through the shift element without slip at the synchronous pressure value (pSYN).

17. The shift element of claim 1, further comprising a compression spring (139, 357), the control body (131, 231, 351) urged towards the first switching position of the control body (131, 231, 351) by the force of the compression spring (139, 357), the control body (131, 231, 351) displaceable into the second switching position of the control body (131, 231, 351) by application of pressure from the pressurized oil source (108) against the force of the compression spring (139, 357).

18. The shift element of claim 1, wherein the control body (131, 231) is arranged concentrically with the sealing body (132, 232) in a valve bore (180).

19. The shift element of claim 1, wherein the control body (131, 351) comprises two essentially cylindrical control body sections (152, 153, 352, 353) with different outer diameters.

20. The shift element (100, 300) of claim 1, wherein the shift element (100, 300) is a transmission brake.

21. The shift element (100, 300) of claim 20, wherein the fast fill valve (303) is arranged in a fixed housing element (161) of a transmission.

22. An automatic transmission, comprising at least one hydraulically actuatable shift element (100, 300) of claim 1.

23. A method for actuating the hydraulically actuatable shift element of claim 1, comprising:
in response to a signal for engaging the shift element (100, 300), outputting a signal from an electronic transmission control unit to the pressurized oil source (108) for reducing a clearance (L) between axially spaced disks (141, 142, 143, 147) of a disk pack (104); and
starting at an applied or measured point in time, when the clearance (L) has been eliminated, outputting a signal for applying pressure onto the clutch piston (101, 301) and, thereby, the disk pack (104).

24. The method of claim 23, further comprising:
during the actuation of the shift element (100) at a starting point in time (t0), increasing a specified pressure (pS) of the fast fill pressure (pSF) with the electronic transmission control unit to a second specified pressure value (p2S);
starting at an applied second point in time (t2) before an expected increase of an actual value due to the sealing-off of the fast fill pressure chamber (126) by the valve piston (131), reducing the specified pressure to a third specified pressure value (p3S) up to a third point in time (t3);
after waiting for an applied time period up to completion of the sealing-off of the fast fill pressure chamber (126) at a fifth point in time (t5), then, starting at the fifth point (t5) in time, reducing the specified pressure (pS) from the third specified pressure value (p3S) to a fourth specified pressure value (p4S) in order to avoid pressure peaks in the clutch pressure chamber (117);
after the fourth specified pressure value (p4S) is reached at a sixth point in time (t6), starting at the sixth point in time (t6), increasing the clutch pressure (pK) up to the fourth specified pressure value (p4S); and
reaching a fourth pressure value (p4) at a seventh point in time (t7),
wherein the fourth specified pressure value (p4S) is held constant up to an applied eighth point in time (t8) and, thereafter, increased to a fifth specified pressure value (p5S), which is reached at a ninth point in time (t9).

25. A method for actuating the hydraulically actuatable shift element of claim 1, comprising:
in response to a signal for engaging the shift element (100, 300), outputting a signal from an electronic transmission control unit to the pressurized oil source (108) to reduce a clearance (L);
increasing a fast fill pressure (pSF) acting upon the fast fill pressure chamber (126) above a synchronous pressure value (pSYN), torque being transmittable through the shift element (100, 300) without slip at the synchronous pressure value (pSYN).

* * * * *